US011368940B2

(12) United States Patent
Chen et al.

(10) Patent No.: US 11,368,940 B2
(45) Date of Patent: Jun. 21, 2022

(54) SYSTEMS AND METHODS FOR DATA TRANSMISSION OVER WI-FI AND LTE-U COEXISTENCE FRAMEWORK

(71) Applicant: METIS IP (SUZHOU) LLC, Jiangsu (CN)

(72) Inventors: Qimei Chen, Suzhou (CN); Zhi Ding, Suzhou (CN)

(73) Assignee: METIS IP (SUZHOU) LLC, Suzhou (CN)

(*) Notice: Subject to any disclaimer, the term of this patent is extended or adjusted under 35 U.S.C. 154(b) by 38 days.

(21) Appl. No.: 17/098,471

(22) Filed: Nov. 16, 2020

(65) Prior Publication Data
US 2021/0068094 A1 Mar. 4, 2021

Related U.S. Application Data

(63) Continuation of application No. PCT/CN2018/087097, filed on May 16, 2018.

(51) Int. Cl.
*H04W 72/04* (2009.01)
*H04W 74/08* (2009.01)

(52) U.S. Cl.
CPC ....... *H04W 72/0406* (2013.01); *H04W 74/08* (2013.01)

(58) Field of Classification Search
CPC . H04W 16/14; H04W 52/0206; H04W 72/00; H04W 72/1215; H04W 72/0406;
(Continued)

(56) References Cited

U.S. PATENT DOCUMENTS

2016/0205562 A1\* 7/2016 Wei .............. H04W 16/14
455/454
2016/0227578 A1 8/2016 Lee et al.
(Continued)

FOREIGN PATENT DOCUMENTS

CN 105611541 A 5/2016
CN 106304100 A 1/2017
CN 106470474 A 3/2017

OTHER PUBLICATIONS

Qimei Chen et al., "Embedding LTE-U within Wi-Fi Bands for Spectrum Efficiency Improvement", IEEE Network, 2017, pp. 72-79. (Year: 2017).\*

(Continued)

*Primary Examiner* — Quoc Thai N Vu
(74) *Attorney, Agent, or Firm* — Metis IP LLC

(57) ABSTRACT

A system includes at least one computer-readable storage medium storing a set of instructions and at least one processor in communication with the at least one computer-readable storage medium. When executing the instructions, the system is directed to receive, from a user of a second wireless network, a request to transmit second wireless network data over a first wireless network and determine a protocol based on one or more parameters associated with the first wireless network and the second wireless network for transmitting the data. The protocol may indicate a resource allocation between second wireless network data transmission and first wireless network data transmission. The system is further directed to obtain information related to a first spectrum of the first wireless network for transmitting the second wireless network data based on the protocol and transmit, to the user, the information related to the first spectrum.

20 Claims, 17 Drawing Sheets

(58) Field of Classification Search
CPC ... H04W 74/04; H04W 74/08; H04W 74/006; H04W 84/12
See application file for complete search history.

(56) References Cited

U.S. PATENT DOCUMENTS

| | | |
|---|---|---|
| 2016/0262169 A1* | 9/2016 | Das .................. H04W 74/04 |
| 2017/0019794 A1 | 1/2017 | Takano |
| 2017/0238319 A1 | 8/2017 | Luft et al. |
| 2018/0077724 A1 | 3/2018 | Kim et al. |

OTHER PUBLICATIONS

International Search Report in PCT/CN2018/087097 dated Feb. 12, 2019, 4 pages.
Written Opinion in PCT/CN2018/087097 dated Feb. 12, 2019, 4 pages.

* cited by examiner

SYSTEMS AND METHODS FOR DATA TRANSMISSION OVER WI-FI AND LTE-U COEXISTENCE FRAMEWORK

CROSS-REFERENCE TO RELATED APPLICATION

This application is a continuation of International Application No. PCT/CN2018/087097, filed on May 16, 2018, the entire contents of which are hereby incorporated by reference.

TECHNICAL FIELD

The present disclosure generally relates to systems and methods for data transmission, and in particular, to systems and methods for data transmission over a wireless fidelity (Wi-Fi) and a long term evolution in unlicensed spectrum (LTE-U) coexistence framework.

BACKGROUND

The rapid growth of mobile wireless applications and consumers continues to strain the limited cellular network capacity and has motivated the exploration of the fifth generation (5G) wireless networks. To meet the demand of data traffic growth, various solutions have been made to boost the network capacity including the LTE-U technology. As the LTE-U technology allows the users to access both licensed and unlicensed spectra, it may cause collision of the LTE-U data transmission and the Wi-Fi data transmission in the unlicensed spectrum and deteriorate the Wi-Fi user experience. Therefore, it is desirable to provide systems and methods that can dynamically optimize the unlicensed spectrum sharing for the coexistence of the LTE-U data transmission and the Wi-Fi data transmission.

SUMMARY

According to an aspect of the present disclosure, a system for wireless data transmission by optimizing spectrum sharing in a first wireless network is provided. The system may include at least one storage medium including a set of instructions and at least one processor in communication with the at least one storage medium. When executing the set of instructions, the at least one processor may be directed to receive, from a user of a second wireless network, a request to transmit second wireless network data over the first wireless network and determine a protocol for transmitting the data based on one or more parameters associated with the first wireless network and the second wireless network. The protocol may indicate a resource allocation between second wireless network data transmission and first wireless network data transmission. The at least one processor may be also directed to obtain information related to a first spectrum of the first wireless network for transmitting the second wireless network data based on the protocol and transmit, to the user, the information related to the first spectrum in response to the request.

In some embodiments, the protocol may define a beacon service interval for transmitting a data frame over the first spectrum of the first wireless network. In some embodiments, the beacon service interval may include a contention free period (CFP) allocated for the second wireless network data transmission and/or a contention period (CP) allocated for the first wireless network data transmission.

In some embodiments, the at least one processor may be directed to receive data from users of the first wireless network over the first spectrum of the first wireless network. In some embodiments, each user of the first wireless network may be assigned with a transmission priority based on at least one of type of data relating to the each user of the first wireless network, data flow relating to the each user of the first wireless network, or data packet length relating to the each user of the first wireless network.

In some embodiments, data of the each user assigned with a high transmission priority may be transmitted using a hybrid coordination function controlled channel access (HCCA) scheme in an inherent transmit opportunity (TXOP) reservation period, and data of the each user assigned with a low transmission priority may transmitted using an enhanced distributed channel access (EDCA) scheme in the TXOP reservation period.

In some embodiments, the at least one processor may be directed to receive data from the user of the second wireless network and a control channel associated with the second wireless network over the first spectrum of the first wireless network.

In some embodiments, the CFP allocated for the second wireless network data transmission may further include at least one transmission period for transmitting a second wireless network data frame. In some embodiments, a length of the at least one transmission period may be determined based on at least one of load of the second wireless network data transmission, throughput requirement of the second wireless network data transmission, or data flow of the second wireless network data transmission.

In some embodiments, the at least one processor may be directed to set a first time point in the CFP indicating a start of the second wireless network data transmission over the first spectrum and set a length of the at least one transmission period in the CFP. The at least one processor may be further directed to adjust a length of the second wireless network data frame to transmit the second wireless network data frame with the at least one transmission period.

In some embodiments, the at least one processor may be directed to determine a length of the beacon service interval based on a delay tolerance parameter of first wireless network users.

In some embodiments, the at least one processor may be directed to determine a length of the CFP in the beacon service interval based on at least one of load of the second wireless network data transmission, resource requirement of the second wireless network data transmission, or Quality of Service (QoS) requirement of the second wireless network data transmission.

In some embodiments, the at least one processor may be directed to determine a length of the CP in the beacon service interval based on at least one of load of the first wireless network data transmission, a collision probability of the first wireless network data transmission, the delay tolerance parameter of the first wireless network users, Quality of Service (QoS) requirement of the first wireless network data transmission, or performance variation of the first wireless network data transmission.

In some embodiments, the at least one processor may be directed to determine a ratio of a length of the CFP to a length of the CP based on at least one of resource requirements of the second wireless network data transmission and the first wireless network data transmission, or performance requirements of the second wireless network data transmission and the first wireless network data transmission.

According to another aspect of the present disclosure, a system for wireless data transmission by optimizing spectrum sharing in a first wireless network is provided. The system may include at least one storage medium including a set of instructions and at least one processor in communication with the at least one storage medium. When executing the set of instructions, the at least one processor may be directed to receive, from a user of a second wireless network, a request to transmit second wireless network data over the first wireless network and determine a protocol based on one or more parameters associated with the first wireless network and the second wireless network for transmitting the data. The protocol may indicate a resource allocation between second wireless network data transmission and first wireless network data transmission. The at least one processor may be also directed to obtain information related to a first spectrum of the first wireless network for transmitting the second wireless network data based on the protocol and obtain information related to a second spectrum of the first wireless network for transmitting a control channel associated with the second wireless network. The at least one processor may be further directed to transmit, to the user, the information related to the first spectrum and the information related to the second spectrum in response to the request.

In some embodiments, the protocol may define a beacon service interval for transmitting a data frame over the first spectrum of the first wireless network. In some embodiments, the beacon service interval may include a contention free period (CFP) allocated for the second wireless network data transmission and a contention period (CP) allocated for the first wireless network data transmission.

In some embodiments, the at least one processor may be directed to receive data from users of the first wireless network over the first spectrum of the first wireless network. In some embodiments each user of the first wireless network may be assigned with a transmission priority based on at least one of type of data relating to the each user of the first wireless network, data flow relating to the each user of the first wireless network, or data packet length relating to the each user of the first wireless network.

In some embodiments, data of the each user assigned with a high transmission priority may be transmitted using a hybrid coordination function controlled channel access (HCCA) scheme in an inherent transmit opportunity (TXOP) reservation period and data of the each user assigned with a low transmission priority may be transmitted using an enhanced distributed channel access (EDCA) scheme in the TXOP reservation period.

In some embodiments, the at least one processor may be directed to receive data from the user of the second wireless network over the first spectrum of the first wireless network and receive the control channel associated with the second wireless network over the second spectrum of the first wireless network.

In some embodiments, the CFP allocated for the second wireless network data transmission may further include at least one transmission period for transmitting a second wireless network data frame. In some embodiments, a length of the at least one transmission period may be determined based on at least one of load of the second wireless network data transmission, throughput requirement of the second wireless network data transmission, or data flow of the second wireless network data transmission.

In some embodiments, the at least one processor may be directed to set a first time point in the CFP indicating a start of the second wireless network data transmission over the first spectrum to correspond to a second time point indicating a start of the control channel transmission over the second spectrum and set a length of the at least one transmission period in the CFP.

In some embodiments, the at least one processor may be directed to determine a length of the beacon service interval based on a delay tolerance parameter of first wireless network users.

In some embodiments, the at least one processor may be directed to determine a length of the CFP in the beacon service interval based on at least one of load of the second wireless network data transmission, resource requirement of the second wireless network data transmission, or Quality of Service (QoS) requirement of the second wireless network data transmission.

In some embodiments, the at least one processor may be directed to determine a length of the CP in the beacon service interval based on at least one of load of the first wireless network data transmission, a collision probability of the first wireless network data transmission, the delay tolerance parameter of the first wireless network users, Quality of Service (QoS) requirement of the first wireless network data transmission, or performance variation of the first wireless network data transmission.

In some embodiments, the at least one processor may be directed to determine a ratio of a length of the CFP to a length of the CP based on at least one of resource requirements of the second wireless network data transmission and the first wireless network data transmission, or performance requirements of the second wireless network data transmission and the first wireless network data transmission.

According to still another aspect of the present disclosure, a method implemented on a computing device having at least one processor and storage for wireless data transmission by optimizing spectrum sharing in a first wireless network may include receiving, from a user of a second wireless network, a request to transmit second wireless network data over the first wireless network and determining a protocol for transmitting the data based on one or more parameters associated with the first wireless network and the second wireless network. The protocol may indicate a resource allocation between second wireless network data transmission and first wireless network data transmission. The method may also include obtaining information related to a first spectrum of the first wireless network for transmitting the second wireless network data based on the protocol and transmitting, to the user, the information related to the first spectrum in response to the request.

In some embodiments, the method may further include receiving data from users of the first wireless network over the first spectrum of the first wireless network, wherein each user of the first wireless network is assigned with a transmission priority based on at least one of type of data relating to the each user of the first wireless network, data flow relating to the each user of the first wireless network, or data packet length relating to the each user of the first wireless network.

In some embodiments, the method may further include receiving data from the user of the second wireless network and a control channel associated with the second wireless network over the first spectrum of the first wireless network.

In some embodiments, the method may further include setting a first time point in the CFP indicating a start of the second wireless network data transmission over the first spectrum and setting a length of the at least one transmission period in the CFP. The method may also include adjusting a length of the second wireless network data frame to transmit the second wireless network data frame with the at least one transmission period.

In some embodiments, the method may further include determining a length of the beacon service interval based on a delay tolerance parameter of first wireless network users.

In some embodiments, the method may further include determining a length of the CFP in the beacon service interval based on at least one of load of the second wireless network data transmission, resource requirement of the second wireless network data transmission, or Quality of Service (QoS) requirement of the second wireless network data transmission.

In some embodiments, the method may further include determining a length of the CP in the beacon service interval based on at least one of load of the first wireless network data transmission, a collision probability of the first wireless network data transmission, the delay tolerance parameter of the first wireless network users, Quality of Service (QoS) requirement of the first wireless network data transmission, or performance variation of the first wireless network data transmission.

In some embodiments, the method may further include determining a ratio of a length of the CFP to a length of the CP based on at least one of resource requirements of the second wireless network data transmission and the first wireless network data transmission, or performance requirements of the second wireless network data transmission and the first wireless network data transmission.

According to still another aspect of the present disclosure, a method implemented on a computing device having at least one processor and storage for wireless data transmission by optimizing spectrum sharing in a first wireless network may include receiving, from a user of a second wireless network, a request to transmit second wireless network data over the first wireless network and determining a protocol based on one or more parameters associated with the first wireless network and the second wireless network for transmitting the data. The protocol may indicate a resource allocation between second wireless network data transmission and first wireless network data transmission. The method may also include obtaining information related to a first spectrum of the first wireless network for transmitting the second wireless network data based on the protocol and obtaining information related to a second spectrum of the first wireless network for transmitting a control channel associated with the second wireless network. The method may further include transmitting, to the user, the information related to the first spectrum and the information related to the second spectrum in response to the request.

In some embodiments, the method may further include receiving data from users of the first wireless network over the first spectrum of the first wireless network, wherein each user of the first wireless network is assigned with a transmission priority based on at least one of type of data relating to the each user of the first wireless network, data flow relating to the each user of the first wireless network, or data packet length relating to the each user of the first wireless network.

In some embodiments, the method may further include receiving data from the user of the second wireless network over the first spectrum of the first wireless network and receiving the control channel associated with the second wireless network over the second spectrum of the first wireless network.

In some embodiments, the method may further include setting a first time point in the CFP indicating a start of the second wireless network data transmission over the first spectrum to correspond to a second time point indicating a start of the control channel transmission over the second spectrum and setting a length of the at least one transmission period in the CFP.

In some embodiments, the method may further include determining a length of the beacon service interval based on a delay tolerance parameter of first wireless network users.

In some embodiments, the method may further include determining a length of the CFP in the beacon service interval based on at least one of load of the second wireless network data transmission, resource requirement of the second wireless network data transmission, or Quality of Service (QoS) requirement of the second wireless network data transmission.

In some embodiments, the method may further include determining a length of the CP in the beacon service interval based on at least one of load of the first wireless network data transmission, a collision probability of the first wireless network data transmission, the delay tolerance parameter of the first wireless network users, Quality of Service (QoS) requirement of the first wireless network data transmission, or performance variation of the first wireless network data transmission.

In some embodiments, the method may further include determining a ratio of a length of the CFP to a length of the CP based on at least one of: resource requirements of the second wireless network data transmission and the first wireless network data transmission, or performance requirements of the second wireless network data transmission and the first wireless network data transmission.

According to still another aspect of the present disclosure, a system for wireless data transmission by optimizing spectrum sharing in a first wireless network is provided. The system may include at least one storage medium including a set of instructions and at least one processor in communication with the at least one storage medium. When executing the set of instructions, the at least one processor may be directed to transmit, to a user of a second wireless network, a request to transmit second wireless network data over the first wireless network and determine a protocol for transmitting the data based on one or more parameters associated with the first wireless network and the second wireless network. The protocol may indicate a resource allocation between second wireless network data transmission and first wireless network data transmission. The at least one processor may be also directed to obtain information related to a first spectrum of the first wireless network for transmitting the second wireless network data based on the protocol.

According to still another aspect of the present disclosure, a system for wireless data transmission by optimizing spectrum sharing in a first wireless network is provided. The system may include at least one storage medium including a set of instructions and at least one processor in communication with the at least one storage medium. When executing the set of instructions, the at least one processor may be directed to transmit, to a user of a second wireless network, a request to transmit second wireless network data over the first wireless network and determine a protocol based on one or more parameters associated with the first wireless network and the second wireless network for transmitting the data. The protocol may indicate a resource allocation between second wireless network data transmission and first wireless network data transmission. The at least one processor may be also directed to obtain information related to a first spectrum of the first wireless network for transmitting the second wireless network data based on the protocol and obtain information related to a second spectrum of the first wireless network for transmitting a control channel associated with the second wireless network.

According to still another aspect of the present disclosure, a non-transitory computer-readable medium is provided. The non-transitory computer-readable medium may include at least one set of instructions for wireless data transmission by optimizing spectrum sharing in a first wireless network. When executed by at least one processor, the at least one set of instructions may direct the at least one processor to receive, from a user of a second wireless network, a request to transmit second wireless network data over the first wireless network and determine a protocol for transmitting the data based on one or more parameters associated with the first wireless network and the second wireless network. The protocol may indicate a resource allocation between second wireless network data transmission and first wireless network data transmission. The at least one set of instructions may also direct the at least one processor to obtain information related to a first spectrum of the first wireless network for transmitting the second wireless network data based on the protocol and transmit, to the user, the information related to the first spectrum in response to the request.

According to still another aspect of the present disclosure, a non-transitory computer-readable medium is provided. The non-transitory computer-readable medium may include at least one set of instructions for wireless data transmission by optimizing spectrum sharing in a first wireless network. When executed by at least one processor, the at least one set of instructions may direct the at least one processor to receive, from a user of a second wireless network, a request to transmit second wireless network data over the first wireless network and determine a protocol based on one or more parameters associated with the first wireless network and the second wireless network for transmitting the data. The protocol may indicate a resource allocation between second wireless network data transmission and first wireless network data transmission. The at least one set of instructions may also direct the at least one processor to obtain information related to a first spectrum of the first wireless network for transmitting the second wireless network data based on the protocol and obtain information related to a second spectrum of the first wireless network for transmitting a control channel associated with the second wireless network. The at least one set of instructions may further direct the at least one processor to transmit, to the user, the information related to the first spectrum and the information related to the second spectrum in response to the request.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
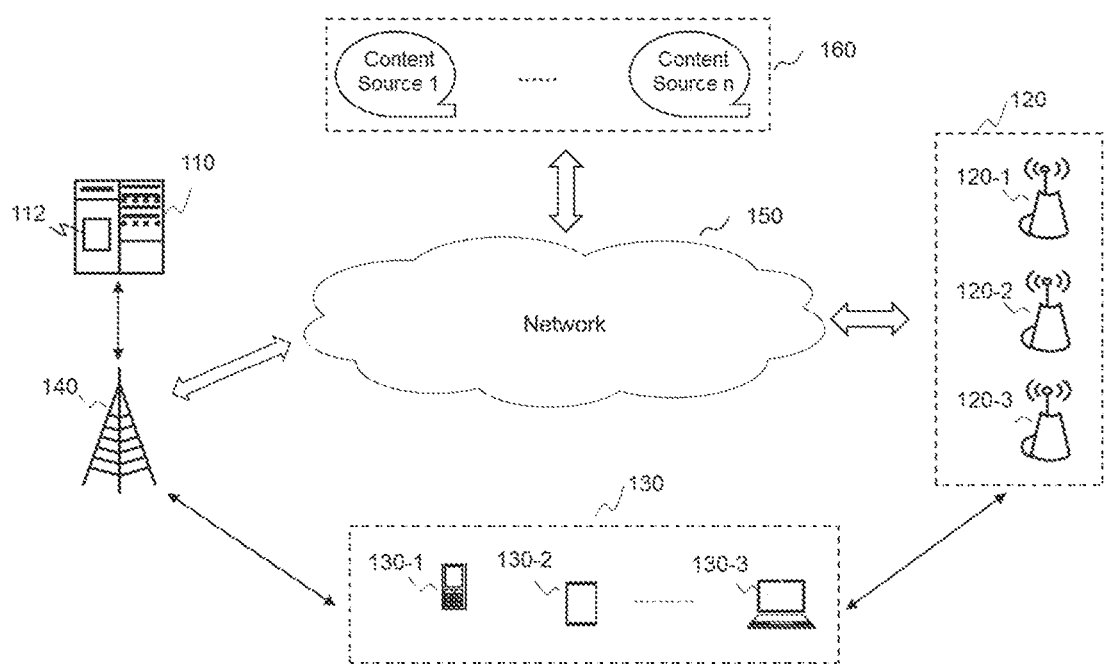
FIG. 1 illustrates an exemplary network environment for providing data transmission over a first wireless network and second wireless network coexistence framework according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, steps, elements, and/or components, but do not preclude the presence or addition of one or more other features, integers, steps, steps, elements, components, and/or groups thereof.

These and other features, and characteristics of the present disclosure, as well as the methods of step and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate steps that systems implement according to some embodiments described in the present disclosure. It is to be expressly understood, the steps of the flowchart may be implemented not in order. Conversely, the steps may be implemented in inverted order, or simultaneously. Moreover, one or more other steps may be added to the flowcharts. One or more steps may be removed from the flowcharts.

An aspect of the present disclosure relates to data transmission over a first wireless network and a second wireless network in a first spectrum coexistence framework. A protocol for transmitting data including second wireless network data is determined. The protocol may indicate a resource allocation between second wireless network data transmission and first wireless network data transmission. A first spectrum for transmitting the second wireless network data may be obtained based on the protocol. Information related to the first spectrum may be transmitted to the user terminal in response to a request for transmitting the data. Both the second wireless network data and a control channel associated with the second wireless network are received from the user terminal over the first spectrum allocated according to the protocol.

Another aspect of the present disclosure relates to data transmission over a first wireless network and a second wireless network in a first spectrum coexistence framework. A protocol for transmitting data including second wireless network data is determined. The protocol may indicate a resource allocation between second wireless network data transmission and first wireless network data transmission. A first spectrum for transmitting the second wireless network data and a second spectrum for transmitting a control channel associated with the second wireless network may be obtained based on the protocol. Information related to the first spectrum and the second spectrum may be transmitted to the user terminal in response to a request for transmitting the data. The second wireless network data is received from the user terminal over the first spectrum and the control channel associated with the second wireless network is received over the second spectrum.

The present disclosure employs a protocol that allows data transmission over a first wireless network and second wireless network coexistence framework. In the first wireless network and second wireless network coexistence framework, the channel access time is divided into a plurality of periodic beacon service intervals. Each beacon service interval may include a contention free period (CFP) allocated for the second wireless network data transmission and a contention period (CP) allocated for the first wireless network data transmission.

FIG. 1 illustrates an exemplary network environment 100 for providing data transmission over a first wireless network and second wireless network coexistence framework according to some embodiments of the present disclosure. The exemplary network environment 100 may include a server 110, a first wireless network access point 120, a user terminal 130, a base station 140, and a network 150.

Exemplary data transmission mode in the exemplary network environment 100 may include second wireless network in a first spectrum (e.g., LTE-U) data transmission and first wireless network (e.g., Wi-Fi) data transmission. In some embodiments, data transmission in the exemplary network environment 100 may be any data transmission mode, such as, data transmission according to the second generation of broadband cellular network technology, data transmission according to the third generation of broadband cellular network technology, data transmission according to the fourth generation of broadband cellular network technology, LTE-U data transmission, Wi-Fi data transmission, or the like, or any combination thereof.

In some embodiments, the first wireless network may include a random access network, a contention based access network, or a wireless fidelity (i.e., Wi-Fi), or the like, or a combination thereof. The first wireless network may include a type of home utilized wireless network. The second wireless network may include a cellular network (i.e., LTE) and/or a controlled access network. The second wireless network may include a type of dedicated wireless network. The first spectrum may be unlicensed spectrum and shared by the first wireless network data transmission and the second wireless network data transmission.

In some embodiments, the server 110 may be a single server, or a server group. The server group may be centralized, or distributed (e.g., the server 110 may be a distributed system). In some embodiments, the server 110 may be local or remote. For example, the server 110 may access data stored in the user terminal 130. As another example, the server 110 may be directly connected to the user terminal 130 to access stored data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process data related to the data transmission to perform one or more functions described in the present disclosure. For example, the processing engine 112 may determine a coexistence framework for the second wireless network data transmission and the first wireless network data transmission. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the first wireless network access point 120 may be a networking hardware device (e.g., a Wi-Fi access point, WAP). The networking hardware device (also referred to as "network equipment" or "computer networking device") may be physical devices that are required for communication and interaction between devices on a computer network (e.g., wireless local area network, WLAN). The networking hardware device may mediate data transmitted over the WLAN.

In some embodiments, the first wireless network access point 120 may connect to a router via a wired network. The first wireless network access point 120 may also be integrated into a router. In some embodiment, the first wireless network access point 120 may be implemented on the user terminal 130. The first wireless network access point 120 may be configured to facilitate uplink data transmission of the first wireless network data and downlink data transmission of the first wireless network data. The uplink data transmission of the first wireless network data transmission may refer to data transmission from the user terminal 130 to the network 150 via the first wireless network access point 120. The downlink data transmission of the first wireless network data transmission may refer to data transmission from the network 150 to the user terminal 130 via the first wireless network access point 120. Functions and configurations of the first wireless network access point 120 may be in accordance with the IEEE 802.11 standards.

In some embodiments, a user may be an owner of the user terminal 130. In some embodiments, the owner of the user terminal 130 may be someone other than the user. In some embodiments, the user terminal 130 may include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

The user and the user terminal 130 may be used interchangeably. The user terminal 130 may transmit first wireless network data to the network 150 via the first wireless network access point 120 and receive first wireless network data from the network 150 via the first wireless network access point 120. The user terminal 130 may transmit second wireless network data to the network 150 via the base station 140 and receive second wireless network data from the network 150 via the base station 140.

In some embodiments, the second wireless network data transmission may include LTE-U data transmission. The base station 140 may communicate with the user terminal 130 to transmit LTE-U data based on the Long-Term Evolution (LTE) standard. The LTE standard may include LTE in Unlicensed spectrum (LTE-U), Licensed Spectrum Access (LAA), MulteFire, or the like.

The second wireless network data transmission may include uplink data transmission of the second wireless network data transmission and downlink data transmission of the second wireless network data transmission. The uplink data transmission of the second wireless network data transmission may refer to data transmission from the user terminal 130 to the network 150 via the base station 140. The downlink data transmission of the second wireless network data transmission may refer to data transmission from the network 150 to the user terminal 130 via the base station 140. In the present application, the second wireless network data transmission and the first wireless network data transmission described above may coexist in the exemplary network environment 100.

The network 150 may be a single network or a combination of different networks. For example, the network 150 may be a local area network (LAN), a wide area network (WAN), a public network, a private network, a proprietary network, a Public Telephone Switched Network (PSTN), the Internet, a wireless network, a virtual network, or any combination thereof. The network 150 may be associated with various network access points, e.g., wired or wireless access points such as base stations 140 or first wireless network access points (e.g., WAPs) 120, through which the user terminal 130 may connect to the network 150 in order to transmit information via the network 150.

In some embodiments, the exemplary network environment 100 may further include one or more content source 160. Content resource 160 may correspond to a website hosted by an entity, whether an individual, a business, or an organization such as USPTO.gov, a content provider such as CNN.com or Youtube.com, a social network website such as Facebook.com, or a content feed source such as Tweeter or blogs. Once the user launches an app, opens a website in the internet browser, or inputs a search query via the app or the website from a user terminal 130, information from the corresponding content source 160 may be retrieved and transmitted to the user terminal 130 via the network 150. The information from the corresponding content source 160 may be transmitted to the user terminal 130 through the first wireless network access point 120, the base station 140, or the combination thereof.

The above description of the present disclosure is provided for the purposes of illustration, and not intended to limit the scope of the present disclosure. For persons having ordinary skills in the art, modules may be combined in various ways, or connected with other modules as subsystems. Various variations and modifications may be conducted under the teaching of the present disclosure. However, those variations and modifications may not depart the spirit and scope of this disclosure. For example, the first wireless network access point 120 and the base station 140 may be integrated as a device performs functions of both the first wireless network access point 120 and the base station 140.

Figure 2:
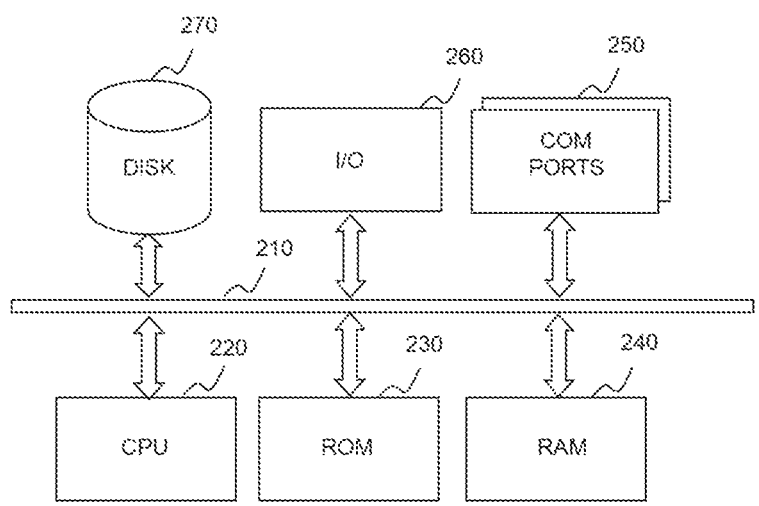
FIG. 2 is a schematic diagram illustrating exemplary hardware and software components of a computing device according to some embodiments of the present disclosure.

FIG. 2 is a schematic diagram illustrating exemplary hardware and software components of a computing device 200 on which the server 110 and/or the user terminal 130 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special purpose computer; both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors, for executing program instructions. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other types of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
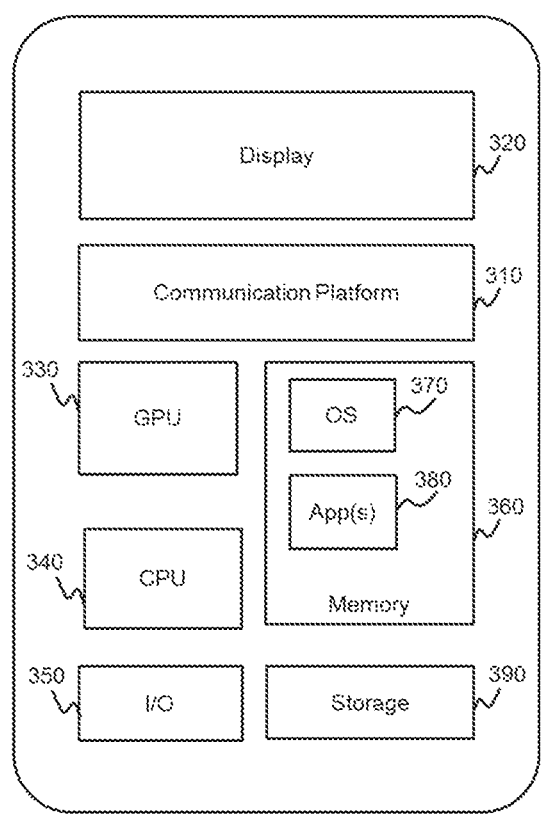
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication module 310, a display 320, a graphics processing unit (GPU) 330, a processor 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The applications 380 may include a browser or any other suitable apps for transmitting, receiving and presenting information relating to the status of the vehicle 140 (e.g., the location of the vehicle 140) from the server 110. User interactions with the information stream may be achieved via the I/O 350 and provided to the server 110 and/or other components of the on-demand service 100 via the network 120.

Figure 4:
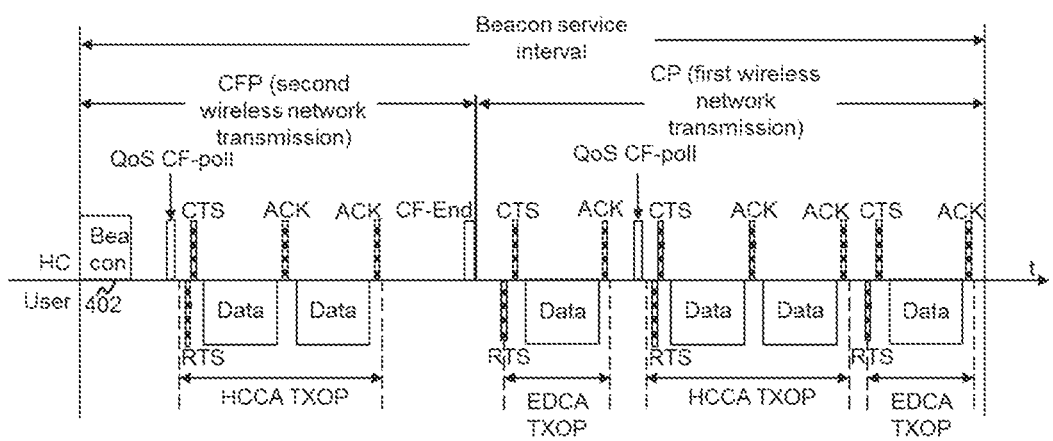
FIG. 4 illustrates an exemplary first wireless network and second wireless network data transmission framework according to some embodiments of the present disclosure.

FIG. 4 illustrates an exemplary second wireless network and first wireless network data transmission framework 400 according to some embodiments of the present disclosure. In some embodiments, the first wireless network and second wireless network coexistence framework 400 may be embedded on the hybrid coordination function (HCF) mechanism, which is a protocol for Wi-Fi infrastructure mode. Within the HCF mechanism, there are two channel access methods: HCF Controlled Channel Access (HCCA) and Enhanced Distributed Channel Access (EDCA). Both EDCA and HCCA define Traffic Categories (TC). For example, emails may be assigned to a low priority class and voice over IP (VoIP) may be assigned to a high priority class. Detailed HCF mechanism may be described in the IEEE 802.11 standards (e.g., IEEE 802.11e, IEEE 802.11n/ac).

In the first wireless network and second wireless network coexistence framework 400, the channel access time is divided into a plurality of periodic beacon service intervals. In the first wireless network and second wireless network coexistence framework 400, the first spectrum (e.g., the unlicensed spectrum) may be shared by the first wireless network data transmission and second wireless network data transmission. Each of the plurality of beacon service intervals may include a contention free period (CFP) followed by a contention period (CP). In both the CFP and the CP, users may transmit data by exploiting inherent transmit opportunity (TXOP) reservation. A TXOP is a reserved time interval during which the user terminal 130 can continue to transmit data frames as long as the duration of the transmissions does not extend beyond the maximum duration of the TXOP. If a data frame is too large to be transmitted in a single TXOP, it may be fragmented into one or more smaller frames.

During the CP, the TXOP may begin at a first start time. In some embodiments, the first start time related to the TXOP may be a time point when the medium is determined to be available under enhanced distributed coordination function (EDCF) rules. For example, the first start time may start after arbitration inter-frame spacing (AIFS) and a backoff time. The AIFS is a time interval between frames being transmitted under the IEEE 802.11e EDCA media access control (MAC) protocol. The processing engine 112 may determine the backoff time based on the IEEE 802.11 standards. The TXOP with EDCA channel access may be called as EDCA TXOP. EDCA provides contention-free access to the channel for the TXOP. With EDCA, high-priority data has a higher probability than low-priority data to be transmitted. That is, a first wireless network user with high priority data traffic may experience less delay than a first wireless network user with low priority data traffic before the data is transmitted. During the CP, all user terminals may function in EDCA.

In another embodiment, the first start time related to the TXOP may be a time point when the user terminal 130 receives a special poll frame from a hybrid coordinator (HC). For example, the special poll frame may be also referred to as quality of service Contention-Free-Poll (QoS CF-Poll). During the CFP, the HC may allow the user terminals 130 to transmit data by sending the CF-Poll frames to the user terminals 130. The HC may coordinate the data streams or sessions initiated by the user terminals 130 and utilize information provided by the user terminals 130 (e.g., the lengths of their respective queues for each traffic class) to assign transmission priority to one user terminal 130 over another. The HC may further utilize such information to optimize its scheduling mechanism. As each user terminal can reserve the TXOP for transmission, the user terminal 130 may send one or more data packets in sequence for a given time period assigned by the HC. The HC may send the QoS CF-Poll after a point coordination function interframe space (PIFS) idle period without backoff. The PIFS idle period may be one of the interframe spaces used in IEEE 802.11 based Wireless LANs. The PIFS idle period may be shorter than the AIFS. During the CFP, the HC may have the access to the medium. The TXOP with HCCA channel access may be called as HCCA TXOP.

During the CFP, the TXOP may begin at a second start time. In some embodiments, the second start time related to the TXOP and the maximum duration of each TXOP may be determined by the HC via sending the QoS CF-Poll. The CFP may end after a pre-determined time period announced in the beacon service interval. The CFP may also end when a CF-end frame is received from the HC.

In the first wireless network and second wireless network coexistence framework 400, the processing engine 112 may allocate the CFP in a beacon service interval for second wireless network data transmission, and allocate the CP in a beacon service interval for the first wireless network data transmission. In some embodiments, the processing engine 112 may determine a length of the beacon service interval based on a delay tolerance parameter of the first wireless network users. The length of the beacon service interval, a length of the CP of the beacon service interval, and a length of the CFP of the beacon service interval may be determined and/or adjusted dynamically with respect to time.

In another embodiment, the processing engine 112 may determine the length of the CP based on the load of the first wireless network data transmission, the collision probability of the first wireless network data transmission, a delay tolerance parameter of the first wireless network data transmission, the quality of service (QoS) requirements of the first wireless network data transmission, and/or the performance variation of the first wireless network data transmission, or any combination thereof. The processing engine 112 may determine the length of the CFP based on the load of the second wireless network data transmission, the resource requirement of the second wireless network data transmission, and/or the real-time requirement of the second wireless network data transmission, or any combination thereof. The processing engine 112 may determine a ratio of the length of the CP to the length of the CFP based on the resource requirements of the second wireless network data transmission and the first wireless network data transmission and/or performance requirements of the second wireless network data transmission and the first wireless network data transmission.

As illustrated in FIG. 4, a beacon service interval in the first wireless network and second wireless network coexistence framework 400 may include a CFP for second wireless network data transmission and a CP for first wireless network data transmission. A horizontal axis represents the time (hereinafter referred to as "t axis"). Transmission of the user data under the HC control channels/frames are illustrated along the t axis.

A Beacon frame 402 may refer to a start of the beacon service interval. The Beacon frame 402 may also refer to an end of the former beacon service interval. The start of the beacon service interval may indicate the availability of the medium for the second wireless network data transmission in the CFP. Following the Beacon frame 402, the user terminal 130 may receive, from the HC, a QoS CF-Poll frame.

The QoS CF-Poll frame may indicate an initiation of the HCCA TXOP in the CFP. The user terminal 130 may respond to the Beacon frame 402 by transmitting, to the HC, a request to send (RTS) signal. The RTS signal may indicate that the user terminal 130 is ready to transmit data to the base station 140. The user terminal 130 may receive, from the HC, a clear to send (CTS) signal. The CTS signal may indicate that the base station 140 is ready to receive data from the user terminal 130. Then the user terminal 130 may transmit a first second wireless network data packet to the base station 140 in an HCCA TXOP. After the base station 140 receives the first transmitted second wireless network data frame, the user terminal 130 may receive, from the HC, a first acknowledgement (ACK) signal. The first ACK signal may indicate a successful reception of the first second wireless network data frame by the base station 140.

As the duration of the HCCA TXOP has not been reached, the user terminal 130 may continue transmitting a second second wireless network data frame to the base station 140. If the second second wireless network data frame is successfully received by the base station 140, a second ACK signal is received at the user terminal 130. The HC may transmit the CF-end frame indicating the end of the CFP. The CFP may also end after a pre-determined time period being announced in the beacon service interval. In some embodiments, a CFP in the beacon service interval may include more than one HCCA TXOP for the second wireless network data transmission before the CFP ends.

The first wireless network data transmission may start in the subsequent CP. The EDCA TXOP starts when the user terminal 130 sends an RTS signal to the base station 140. Upon receiving a CTS signal, the user terminal 130 may start transmitting a first first wireless network data frame in the EDCA TXOP. The first wireless network data transmitted in the EDCA TXOP may be classified as a low priority. Low priority data traffic may have to compete accessing the medium for an opportunity to transmit in the EDCA TXOP. More description regarding the data traffic priorities and the transmitting of first wireless network data with various priorities by competing accessing the medium in the EDCA TXOP may be found elsewhere in the present disclosure, for example, in FIG. 13 and the descriptions thereof.

Further, the HC may transmit, to the user terminal 130, the QoS CF-Poll frame indicating a start of the HCCA TXOP in the CP. The user terminal 130 may respond to the QoS CF-Poll frame by transmitting, to the HC, an RTS signal. Upon receiving from the HC, a CTS signal, the user terminal 130 may transmit the first wireless network data in the HCCA TXOP of the CP. The user terminal 130 may transmit one or more first wireless network data frames until the duration of the HCCA TXOP is reached. The first wireless network data transmitted in the HCCA TXOP may be classified as a highest priority. More description regarding the data traffic priorities and the transmitting of first wireless network data with various priorities in the EDCA TXOP may be found elsewhere in the present disclosure, for example, in FIG. 13 and the descriptions thereof. In some embodiments, a CP in the beacon service interval may include more than one EDCA TXOP and/or HCCA TXOP for first wireless network data transmission before the CP ends.

It should be noted that the above descriptions about the first wireless network and second wireless network coexistence framework 400 is provided for illustration purposes, and should not be designated as the only practical embodiment. For persons having ordinary skills in the art, after understanding the general principle of the first wireless network and second wireless network coexistence framework 400, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. For example, although FIG. 4 shows one HCCA TXOP in the CFP, one HCCA TXOP in the CP, and two EDCA TXOP in the CP, the number of the HCCA TXOP in the CFP, the number of the EDCA TXOP in the CP, and the number of the HCCA TXOP in the CP can be any other values. As another example, the first wireless network data transmission in the CP may starts with the HCCA TXOP instead of the EDCA TXOP.

Figure 5:
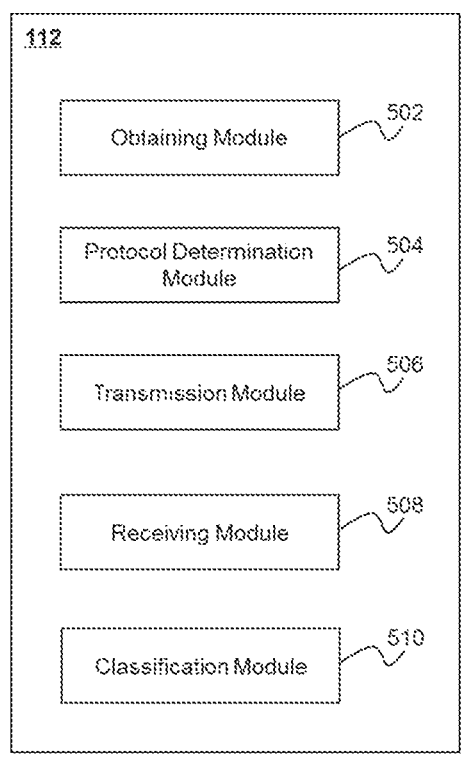
FIG. 5 illustrates an exemplary system diagram of the processing engine according to some embodiments of the present disclosure.

FIG. 5 illustrates an exemplary system diagram of the processing engine 112 according to some embodiments of the present disclosure. The processing engine 112 may include an obtaining module 502, a protocol determination module 504, a transmission module 506, a receiving module 508 and a classification module 510. At least a portion of the processing engine 112 may be implemented on a computing device as illustrated in FIG. 2 or a mobile device as illustrated in FIG. 3.

The obtaining module 502 may be configured to obtain information related to a second spectrum and information related to a first spectrum for transmitting the second wireless network data based on a protocol. In some embodiments, the first spectrum may be unlicensed spectrum and shared by the first wireless network data transmission and the second wireless network data transmission. The second spectrum may be licensed spectrum. The protocol may be configured to enable the coexistence of the second wireless network data transmission and the first wireless network data transmission over the first spectrum. The obtaining module 502 may obtain or determine occupancy rate of first spectrums, a start time of the beacon service interval, and/or the length of the CFP base on the protocol. The obtaining module 502 may search for the first spectrum based on the occupancy rate of first spectrums, the start time of the beacon service interval, and/or the length of the CFP, or any combination thereof. The obtaining module 502 may obtain the information related to the first spectrum based on the search result.

The obtaining module 502 may obtain or determine occupancy rate of second spectrums and/or interference state of second spectrums. The processing engine 112 may search for the second spectrum based on the occupancy rate of second spectrums and/or the interference state of second spectrums. The obtaining module 502 may obtain the information related to the second spectrum based on the search result.

The protocol determination module 504 may be configured to determine a protocol for transmitting the data. In some embodiments, the protocol may be configured to enable the coexistence of the second wireless network data transmission and the first wireless network data transmission over the first spectrum. The protocol may also indicate a resource allocation between the second wireless network data transmission and the first wireless network data transmission. The protocol determination module 504 may determine the protocol based on the HCF mechanism.

The transmission module 506 may be configured to transmit, to a user terminal, a request to transmit data to the network including at least the second wireless network data. The second wireless network data may include LTE-U data. The LTE-U data may refer to data transmitted according to the LTE-U standard. The transmission module 506 may be configured to transmit, to the user terminal, the information related to the second spectrum and the information related to the first spectrum that are available to use in response to the request. The transmission module 506 may be further configured to transmit, to the user terminal, the second wireless network data and a control channel associated with the second wireless network. The transmission module 506 may be further configured to transmit, to the user terminal, an ACK signal. The ACK signal may indicate a successful reception of the data transmitted by the user terminal.

The receiving module 508 may be configured to receive, from a user terminal, a request to transmit data including at least second wireless network data. The second wireless network data may include LTE-U data. The LTE-U data may refer to data transmitted according to the second wireless network standard. The receiving module 508 may be further configured to receive, from the user terminal, the second wireless network data and a control channel associated with the second wireless network. The receiving module 508 may be further configured receive, from the user terminal, an ACK signal. The ACK signal may indicate a successful reception of the data transmitted to the user terminal.

The classification module 510 may be configured to classify data related to a plurality of first wireless network users into a plurality of priorities. In some embodiments, the classification module 510 may classify the data into the plurality of priorities based on the types of the data transmitted by the plurality of first wireless network users. The types of the data may include audio data, video data, best-effort data, and background data, or the like. In some embodiment, the classification module 510 may classify the data into the plurality of priorities based on the different data flows or different packet lengths etc. In some embodiment, the classification module 510 may classify the data into the plurality of priorities based on a combination of the types of the data, the different data flows or different packet lengths, etc.

It should be noted that the above description of the processing engine 112 is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
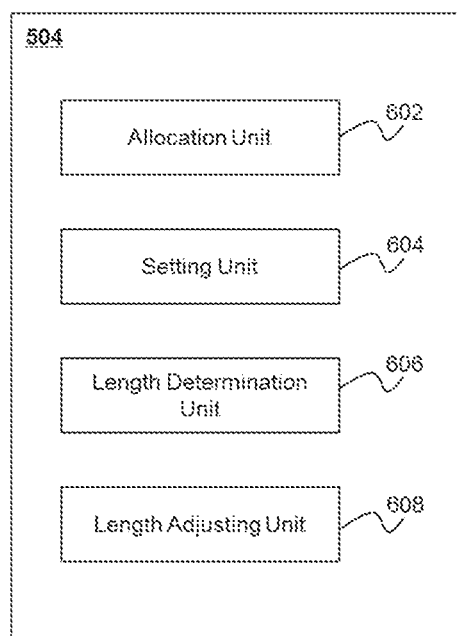
FIG. 6 illustrates an exemplary system diagram of the protocol determination module according to some embodiments of the present disclosure.

FIG. 6 illustrates an exemplary system diagram of the protocol determination module 504 according to some embodiments of the present disclosure. The protocol determination module 504 may include an allocation unit 602, a setting unit 604, a length determination unit 606, and length adjusting unit 608. At least a portion of the protocol determination module 504 may be implemented on a computing device as illustrated in FIG. 2 or a mobile device as illustrated in FIG. 3.

The allocation unit 602 may be configured to search for a first spectrum (e.g., unlicensed spectrum). The allocation unit 602 may search for the first spectrum based on the occupancy rate of first spectrums, a start time of the beacon service interval, and/or the length of the CFP, or any combination thereof. The allocation unit 602 may obtain or determine occupancy rate of second spectrums and/or interference state of second spectrums. The allocation unit 602 may search for the second spectrum based on the occupancy rate of second spectrums and/or the interference state of second spectrums.

The setting unit 604 may be configured to set a time point indicating a start of the control channel transmission over the second spectrum (e.g., licensed spectrum). The setting unit 604 may set a time point in the CFP indicating a start of the second wireless network data transmission over the first spectrum. The start of the second wireless network data transmission may correspond to the time point indicating the start of the control channel. The control channel may include one or more data frames to control the transmission of the second wireless network data.

The length determination unit 606 may be configured to set a length of the HCCA TXOP in the CFP. The length determination unit 606 may set the length of the HCCA TXOP in the CFP based on one or more parameters relating to the second wireless network data frame. The one or more parameters relating to the second wireless network data frame may include the load of the second wireless network data frame, the throughput requirement of the second wireless network data transmission, and/or the data flow of the second wireless network data frame, or a combination thereof. In some embodiments, the length of the CFP may be an integer.

The length adjusting unit 608 may be configured to adjust a length of the second wireless network data frame to transmit the second wireless network data frame with the HCCA TXOP in the CFP. In some embodiments, the length of the HCCA TXOP in the CFP may be too short to accommodate a second wireless network data frame (e.g., 10 ms). The length adjusting unit 608 may shorten the length of the second wireless network data frame so that the second wireless network data frame can be embedded in the HCCA TXOP in the CFP. The length adjusting unit 608 may shorten the length of the second wireless network data based on the discontinuous reception (DRX) mechanism and the discontinuous transmission (DTX) mechanism in the LTE protocol.

It should be noted that the above description of the protocol determination module 504 is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7A:
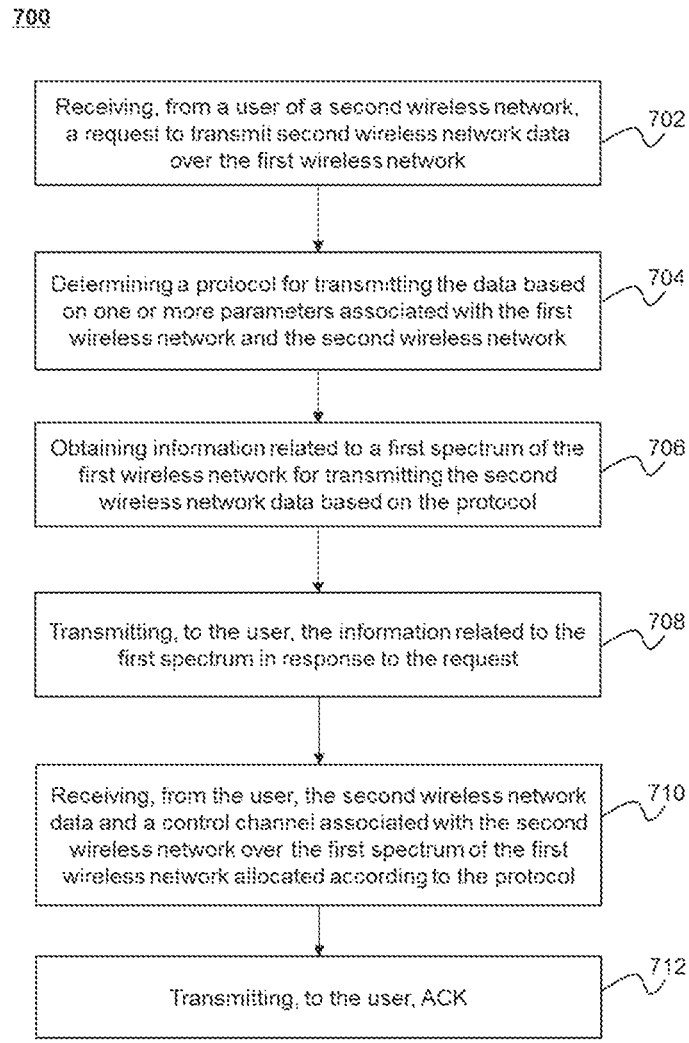
FIG. 7A illustrates an exemplary flowchart of an uplink data transmission in a standalone mode in the first wireless network and second wireless network coexistence framework according to some embodiments of the present disclosure.

FIG. 7A illustrates an exemplary flowchart of an uplink data transmission in a standalone mode in the first wireless network and second wireless network coexistence framework according to some embodiments of the present disclosure. In some embodiments, the processing engine 112 may perform the process 700 to receive, from the user terminal 130, the second wireless network data and the control channel associated with the second wireless network over the first spectrum allocated according to the protocol. In some embodiments, one or more operations of the process 700 illustrated in FIG. 7 for receiving, from the user terminal 130, the second wireless network data and the control channel associated with the second wireless network over the first spectrum allocated according to the protocol may be implemented in the exemplary network environment 100 illustrated in FIG. 1. For example, the process 700 illustrated in FIG. 7 may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In some embodiments, the first wireless network may include a random access network, a contention based access network, or a wireless fidelity (i.e., Wi-Fi), or the like, or a combination thereof. The second wireless network may include a cellular network (i.e., LTE) and/or a controlled access network. The first spectrum may be unlicensed spectrum and shared by the first wireless network data transmission and the second wireless network data transmission.

In 702, the processing engine 112 (e.g., the receiving module 508) may receive, from a user of a second wireless network (e.g., the user terminal 130), a request to transmit second wireless network data over the first wireless network The second wireless network data may include LTE-U data. The LTE-U data may refer to data transmitted according to the LTE-U standard.

In 704, the processing engine 112 (e.g., the protocol determination module 504) may determine a protocol for transmitting the data based on one or more parameters associated with the first wireless network and the second wireless network. In some embodiments, the protocol may be configured to enable the coexistence of the second wireless network data transmission and the first wireless network data transmission over the first spectrum. The protocol may also indicate a resource allocation between the second wireless network data transmission and the first wireless network data transmission. The processing engine 112 may determine the protocol based on the HCF mechanism.

In the first wireless network and second wireless network coexistence framework 400, the channel access time is divided into a plurality of periodic beacon service intervals. Each of the plurality of beacon service intervals may include a CFP followed by a CP. The processing engine 112 may allocate the CFP for second wireless network data transmission. More description regarding the protocol may be found elsewhere in the present disclosure, for example, in FIG. 4 and the descriptions thereof.

In 706, the processing engine 112 (e.g., the obtaining module 502) may obtain information related to a first spectrum of the first wireless network for transmitting the second wireless network data based on the protocol. The processing engine 112 may obtain or determine occupancy rate of first spectrums, a start time of the beacon service interval, and/or the length of the CFP base on the protocol. The processing engine 112 may search for the first spectrum based on the occupancy rate of first spectrums, the start time of the beacon service interval, and/or the length of the CFP, or any combination thereof. The processing engine 112 may determine the information related to the first spectrum to be used for the data transmission from the user terminal based on the search result.

The occupancy rate of first spectrums may indicate a usage percentage of the first spectrum by any type of data transmission. The start time of the beacon service interval may indicate a time point when the medium is available for data transmission such as the second wireless network data transmission and the first wireless network data transmission. The processing engine 112 may determine the length of the CFP based on the load of the second wireless network data transmission, the resource requirement of the second wireless network data transmission, and/or real-time requirement of the second wireless network data transmission, or any combination thereof. More description regarding the length of the CFP may be found elsewhere in the present disclosure, for example, in FIG. 4 and the descriptions thereof.

In 708, the processing engine 112 (e.g., the transmission module 506) may transmit, to the user (e.g., the user terminal 130), the information related to the first spectrum in response to the request. The information related to the first spectrum may include frequency range of the first spectrum.

In 710, the processing engine 112 (e.g., the receiving module 508) may receive, from the user (e.g., the user terminal 130), the second wireless network data and a control channel associated with the second wireless network over the first spectrum of the first wireless network allocated according to the protocol. The control channel may include one or more data frames to control the transmission of the second wireless network data. The processing engine 112 may control a start time for transmitting the second wireless network data based on the control channel. The start of the second wireless network data transmission may correspond to a time point indicating a start of the control channel. For example, the processing engine 112 may send, based on the received RTS signal, a CTS signal allowing the start of the second wireless network data transmission or the first wireless network data transmission from the user terminal 130 to the base station 140. The control channel from the user terminal 130 may be transmitted to the base station 140 along with the second wireless network data over the first spectrum.

In 712, the processing engine 112 (e.g., the transmission module 506) may transmit, to the user (e.g., the user terminal 130), an ACK signal. The ACK signal may indicate a successful reception at the base station 140 of the second wireless network data transmitted by the user terminal 130.

It should be noted that the above descriptions about the processing of receiving, from the user terminal 130, the second wireless network data and the control channel associated with the second wireless network over the first spectrum is provided for illustration purposes, and should not be designated as the only practical embodiment. For persons having ordinary skills in the art, after understanding the general principle of the process for receiving, from the user terminal 130, the second wireless network data and the control channel associated with the second wireless network over the first spectrum, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Figure 7B:
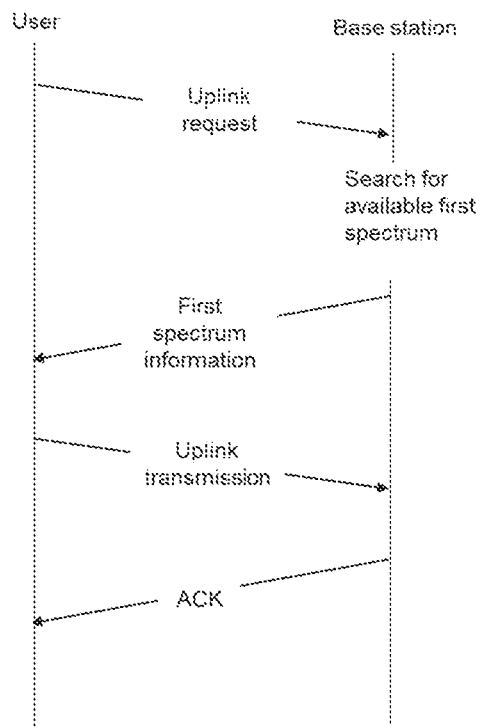
FIG. 7B illustrates an exemplary schematic diagram of the uplink data transmission in a standalone mode in the first wireless network and second wireless network coexistence framework according to some embodiments of the present disclosure.

FIG. 7B illustrates an exemplary schematic diagram of the uplink data transmission in a standalone mode in the first wireless network and second wireless network coexistence framework according to some embodiments of the present disclosure.

Figure 8A:
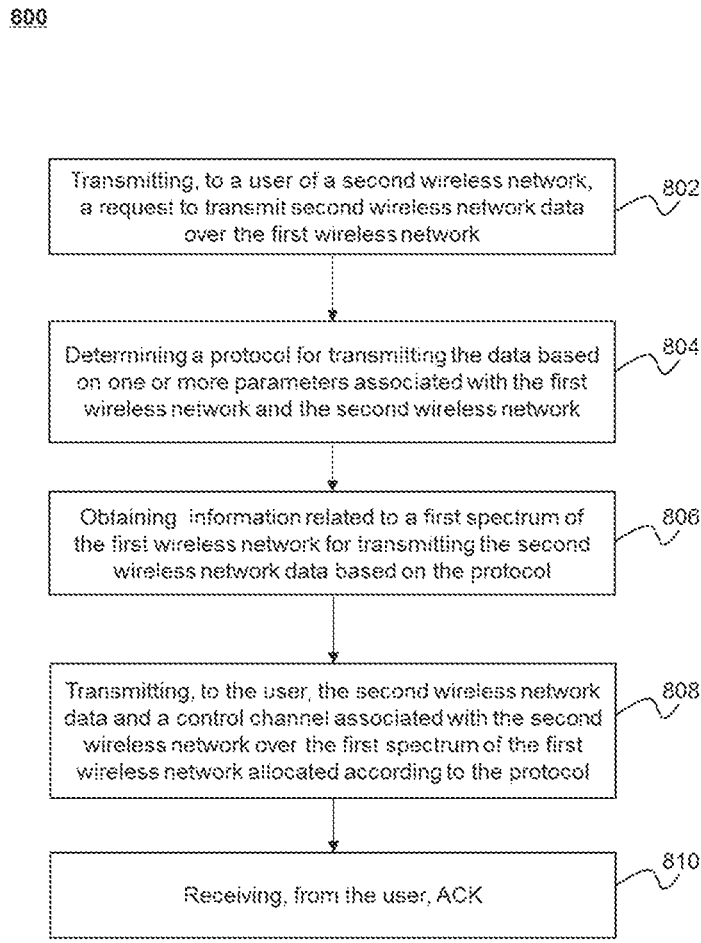
FIG. 8A illustrates an exemplary flowchart of a downlink data transmission in a standalone mode in the first wireless network and second wireless network coexistence framework according to some embodiments of the present disclosure.

FIG. 8A illustrates an exemplary flowchart of a downlink data transmission in a standalone mode in the first wireless network and second wireless network coexistence framework according to some embodiments of the present disclosure. In some embodiments, the processing engine 112 may perform the process 800 to transmit, to the user terminal 130, the second wireless network data and the control channel associated with the second wireless network over the first spectrum. In some embodiments, one or more operations of the process 800 illustrated in FIG. 8A for transmitting, to the user terminal 130, the second wireless network data and the control channel associated with the second wireless network over the first spectrum may be implemented in the exemplary network environment 100 illustrated in FIG. 1. For example, the process 800 illustrated in FIG. 8A may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In some embodiments, the first wireless network may include a random access network, a contention based access network, or a wireless fidelity (i.e., Wi-Fi), or the like, or a combination thereof. The second wireless network may include a cellular network (i.e., LTE) and/or a controlled access network. The first spectrum may be unlicensed spectrum and shared by the first wireless network data transmission and the second wireless network data transmission.

In 802, the processing engine 112 (e.g., the transmission module 506) may transmit, to a user of a second wireless network (e.g., the user terminal 130), a request to transmit second wireless network data over the first wireless network. The second wireless network data may include LTE-U data. The LTE-U data may refer to data transmitted according to the LTE-U standard.

In 804, the processing engine 112 (e.g., the protocol determination module 504) may determine a protocol for transmitting the data based on one or more parameters associated with the first wireless network and the second wireless network. In some embodiments, the protocol may be configured to enable the coexistence of the second wireless network data transmission and the first wireless network data transmission over the first spectrum. The protocol may indicate a resource allocation between the second wireless network data transmission and the first wireless network data transmission. The processing engine 112 may determine the protocol based on the HCF mechanism.

In the first wireless network and second wireless network coexistence framework 400, the channel access time is divided into a plurality of periodic beacon service intervals. Each of the plurality of beacon service intervals may include a CFP followed by a CP. The processing engine 112 may allocate the CFP for second wireless network data transmission. More description regarding the protocol may be found elsewhere in the present disclosure, for example, in FIG. 4 and the descriptions thereof.

In 806, the processing engine 112 (e.g., the obtaining module 502) may obtain information related to a first spectrum of the first wireless network for transmitting the second wireless network data based on the protocol. The processing engine 112 may obtain or determine the occupancy rate of first spectrums, a start time of the beacon service interval, and/or the length of the CFP base on the protocol. The processing engine 112 may search for the first spectrum based on the occupancy rate of first spectrums, the start time of the beacon service interval, and/or the length of the CFP, or any combination thereof. The processing engine 112 may determine the first spectrum to be used for the data transmission from the user terminal based on the search result.

The occupancy rate of a first spectrum may indicate a usage percentage of the first spectrum by any type of data transmission. The start time of the beacon service interval may indicate a time point when the medium is available for data transmission such as the second wireless network data transmission and the first wireless network data transmission. The processing engine 112 may determine the length of the CFP based the load of the second wireless network data transmission, the resource requirement of the second wireless network data transmission, and/or real-time requirement of the second wireless network data transmission, or any combination thereof. More description regarding the length of the CFP may be found elsewhere in the present disclosure, for example, in FIG. 4 and the descriptions thereof.

In 808, the processing engine 112 (e.g., the transmission module 506) may transmit, to the user (e.g., the user terminal 130), the second wireless network data and a control channel associated with the second wireless network over the first spectrum of the first wireless network allocated according to the protocol. The control channel may include one or more data frames to control the transmission of the second wireless network data. The processing engine 112 may control a start time for transmitting the second wireless network data based on the control channel. For example, the processing engine 112 may send, based on the received RTS signal, a CTS signal allowing the start of the second wireless network data transmission or the first wireless network data transmission from the user terminal 130 to the base station 140. The control channel from the base station 140 may be transmitted to the user terminal 130 along with the second wireless network data over the first spectrum.

In 810, the processing engine 112 (e.g., receiving module 508) may receive, from the user (e.g., the user terminal 130), an ACK signal. The ACK signal may indicate a successful reception at the user terminal 130 of the second wireless network data transmitted by the base station 140.

It should be noted that the above descriptions about the processing of transmitting, to the user terminal 130, the second wireless network data and the control channel associated with the second wireless network over the first spectrum is provided for illustration purposes, and should not be designated as the only practical embodiment. For persons having ordinary skills in the art, after understanding the general principle of the process for receiving, from the user terminal 130, the second wireless network data and the control channel associated with the second wireless network over the first spectrum, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Figure 8B:
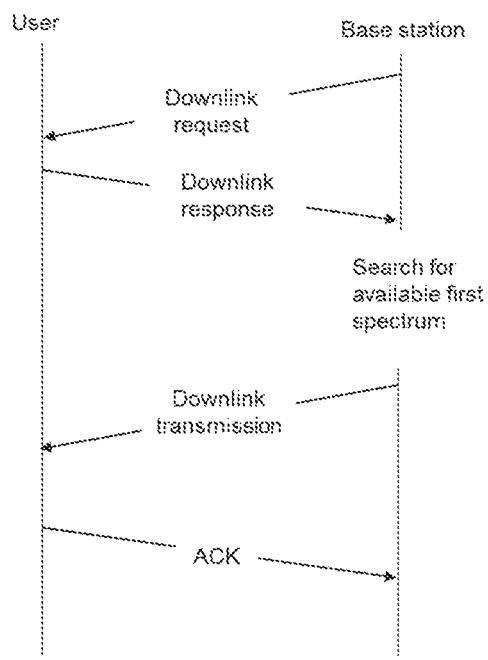
FIG. 8B illustrates an exemplary schematic diagram of the downlink data transmission in a standalone mode in the first wireless network and second wireless network coexistence framework according to some embodiments of the present disclosure.

FIG. 8B illustrates an exemplary schematic diagram of the downlink data transmission in a standalone mode in the first wireless network and second wireless network coexistence framework according to some embodiments of the present disclosure.

Figure 9:
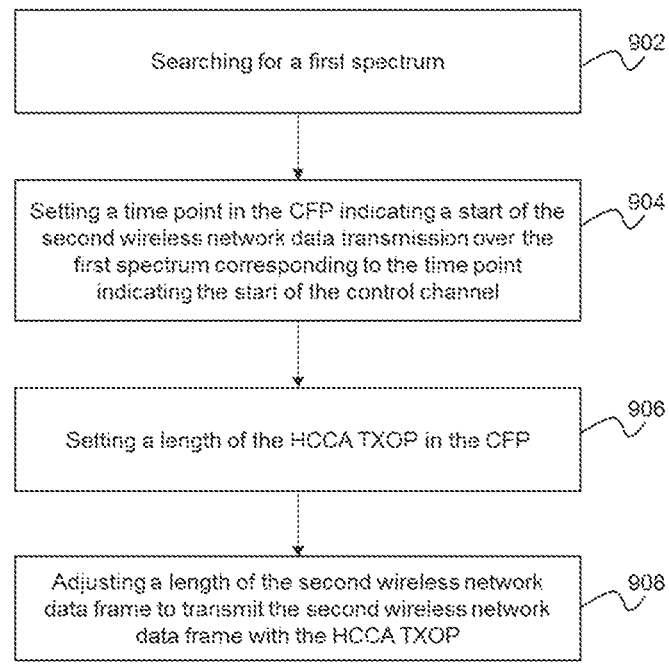
FIG. 9 illustrates an exemplary flowchart of determining the first spectrum and allocating resources for data transmission in a standalone mode in the first wireless network and second wireless network coexistence framework according to some embodiments of the present disclosure.

FIG. 9 illustrates an exemplary flowchart of determining the first spectrum and allocating resources for data transmission in a standalone mode in the first wireless network and second wireless network coexistence framework according to some embodiments of the present disclosure. In some embodiments, the processing engine 112 may perform the process 900 to adjust the length of the second wireless network data frame to transmit the second wireless network data frame with the HCCA TXOP. In some embodiments, one or more operations of the process 900 illustrated in FIG. 9 for adjusting the length of the second wireless network data frame to transmit the second wireless network data frame with the HCCA TXOP may be implemented in the exemplary network environment 100 illustrated in FIG. 1. For example, the process 900 illustrated in FIG. 9 may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In some embodiments, the first wireless network may include a random access network, a contention based access network, or a wireless fidelity (i.e., Wi-Fi), or the like, or a combination thereof. The second wireless network may include a cellular network (i.e., LTE) and/or a controlled access network. The first spectrum may be unlicensed spectrum and shared by the first wireless network data transmission and the second wireless network data transmission.

In 902, the protocol determination module 504 (e.g., the allocation unit 602) may search for a first spectrum. The protocol determination module 504 may search for the first spectrum based on the occupancy rate of first spectrums, a start time of the beacon service interval, and/or the length of the CFP, or any combination thereof. The occupancy rate of a first spectrum may indicate a usage percentage of the first spectrum by any type of data transmission. The start time of the beacon service interval may indicate a time point when the medium is available for data transmission such as the second wireless network data transmission and the first wireless network data transmission.

In 904, the protocol determination module 504 (e.g., the setting unit 604) may set a time point in the CFP indicating a start of the second wireless network data transmission over the first spectrum corresponding to a time point indicating the start of the control channel. The control channel may include one or more data frames to control the transmission of the second wireless network data. The processing engine 112 may control a start time for transmitting the second wireless network data based on the control channel. For example, the processing engine 112 may send, based on the received RTS signal, a CTS signal allowing the start of the second wireless network data transmission or the first wireless network data transmission from the user terminal 130 to the base station 140.

In 906, the protocol determination module 504 (e.g., the length determination unit 606) may set a length of the HCCA TXOP in the CFP. The protocol determination module 504 may set the length of the HCCA TXOP in the CFP based on one or more parameters relating to the second wireless network data frame. The one or more parameters relating to the second wireless network data frame may include load of the second wireless network data frame, throughput requirement of the second wireless network data transmission, and/or data flow of the second wireless network data frame, or a combination thereof.

In 908, the protocol determination module 504 (e.g., the length adjusting unit 608) may adjust a length of the second wireless network data frame to transmit the second wireless network data frame with the HCCA TXOP in the CFP. In some embodiments, the length of the HCCA TXOP in the CFP may be too short to accommodate a second wireless network data frame (e.g., 10 ms). The protocol determination module 504 may shorten the length of the second wireless network data frame so that the second wireless network data frame can be embedded in the HCCA TXOP in the CFP. The protocol determination module 504 may shorten the length of the second wireless network data based on the discontinuous reception (DRX) mechanism and discontinuous transmission (DTX) mechanism in the LTE protocol.

It should be noted that the above descriptions about the processing of adjusting the length of the second wireless network data frame to transmit the second wireless network data frame with the HCCA TXOP is provided for illustration purposes, and should not be designated as the only practical embodiment. For persons having ordinary skills in the art, after understanding the general principle of the process for adjusting the length of the second wireless network data frame to transmit the second wireless network data frame with the HCCA TXOP, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Figure 10A:
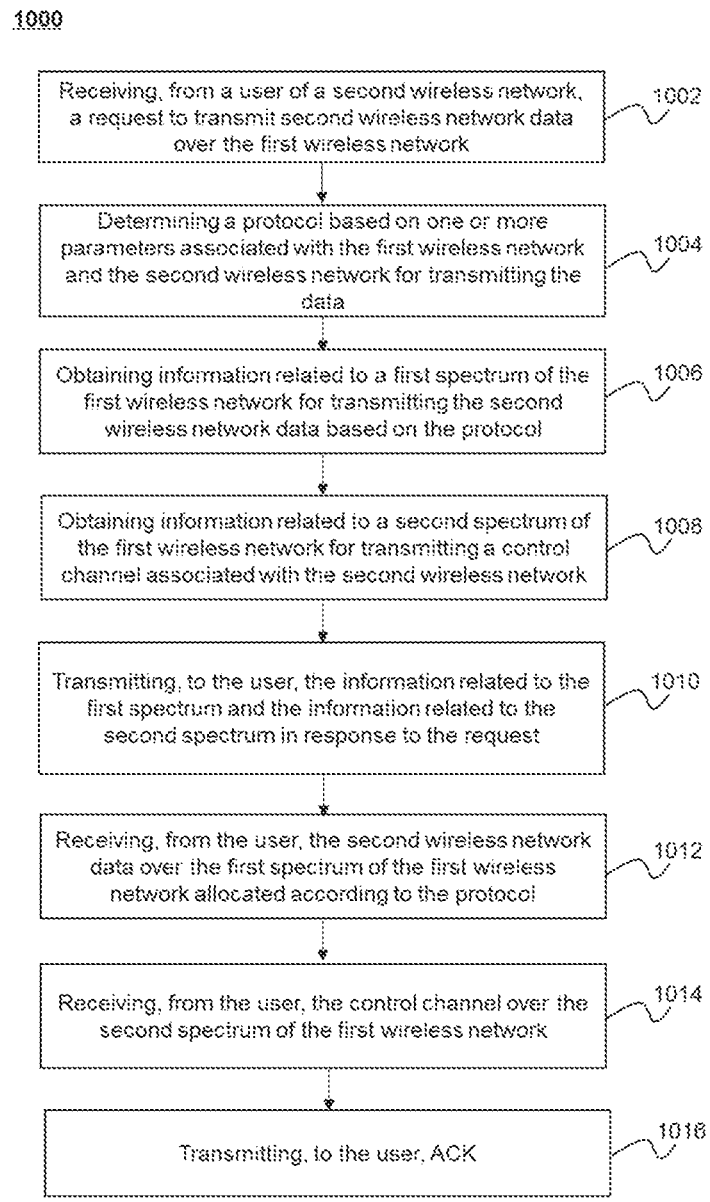
FIG. 10A illustrates an exemplary flowchart of an uplink data transmission in an unlicensed carrier aggregation (UCA) mode in the first wireless network and second wireless network coexistence framework according to some embodiments of the present disclosure.

FIG. 10A illustrates an exemplary flowchart of an uplink data transmission in an unlicensed carrier aggregation (UCA) mode in the first wireless network and second wireless network coexistence framework according to some embodiments of the present disclosure. In some embodiments, the processing engine 112 may perform the process 1000 to receive, from the user terminal 130, the second wireless network data and the control channel associated with the second wireless network. In some embodiments, one or more operations of the process 1000 illustrated in FIG. 10A for receiving, from the user terminal 130, the second wireless network data and the control channel associated with the second wireless network may be implemented in the exemplary network environment 100 illustrated in FIG. 1. For example, the process 1000 illustrated in FIG. 10A may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In some embodiments, the first wireless network may include a random access network, a contention based access network, or a wireless fidelity (i.e., Wi-Fi), or the like, or a combination thereof. The second wireless network may include a cellular network (i.e., LTE) and/or a controlled access network.

In 1002, the processing engine 112 (e.g., the receiving module 508) may receive, from a user of a second wireless network (e.g., the user terminal 130), a request to transmit second wireless network data over the first wireless network. The second wireless network data may include LTE-U data. The LTE-U data may refer to data transmitted according to the LTE-U standard.

In 1004, the processing engine 112 (e.g., the protocol determination module 504) may determine a protocol based on one or more parameters associated with the first wireless network and the second wireless network for transmitting the data. In some embodiments, the protocol may be configured to enable the coexistence of the second wireless network data transmission and the first wireless network data transmission over the first spectrum. The protocol may also indicate a resource allocation between the second wireless network data transmission and the first wireless network data transmission. The processing engine 112 may determine the protocol based on the HCF mechanism.

In the first wireless network and second wireless network coexistence framework 400, the channel access time is divided into a plurality of periodic beacon service intervals. Each of the plurality of beacon service intervals may include a CFP followed by a CP. The processing engine 112 may allocate the CFP for second wireless network data transmission. More description regarding the protocol may be found elsewhere in the present disclosure, for example, in FIG. 4 and the descriptions thereof.

In 1006, the processing engine 112 (e.g., the obtaining module 502) may obtain information related to a first spectrum of the first wireless network for transmitting the second wireless network data based on the protocol. In some embodiments, the first spectrum may be unlicensed spectrum and shared by the first wireless network data transmission and the second wireless network data transmission. The processing engine 112 may obtain or determine occupancy rate of first spectrums, a start time of the beacon service interval, and/or the length of the CFP base on the protocol. The processing engine 112 may search for the first spectrum based on the occupancy rate of first spectrums, the start time of the beacon service interval, and/or the length of the CFP, or any combination thereof. The processing engine 112 may determine the information related to the first spectrum to be used for the data transmission from the user terminal based on the search result.

The occupancy rate of a first spectrum may indicate a usage percentage of the first spectrum by any type of data transmission. The start time of the beacon service interval may indicate a time point when the medium is available for data transmission such as the second wireless network data transmission and the first wireless network data transmission. The processing engine 112 may determine the length of the CFP based on the load of the second wireless network data transmission, the resource requirement of the second wireless network data transmission, and/or real-time requirement of the second wireless network data transmission, or any combination thereof. More description regarding the length of the CFP may be found elsewhere in the present disclosure, for example, in FIG. 4 and the descriptions thereof.

In 1008, the processing engine 112 (e.g., the obtaining module 502) may obtain information related to a second spectrum of the first wireless network for transmitting a control channel associated with the second wireless network. In some embodiments, the second may be licensed spectrum. The processing engine 112 may obtain or determine occupancy rate of second spectrums and/or interference state of second spectrums. The processing engine 112 may search for the second spectrum based on the occupancy rate of second spectrums and/or the interference state of second spectrums. The interference state of a second spectrum may indicate a status as to whether a second spectrum is interfered by any signals and the level of interference when transmitting a signal between a source (e.g., the user terminal 130, the base station 140) and a receiver (e.g., the user terminal 130, the base station 140). The processing engine 112 may obtain the information related to the second spectrum based on the search result.

In 1010, the processing engine 112 (e.g., the transmission module 506) may transmit, to the user (e.g., the user terminal 130), the information related to the first spectrum and the information related to the second spectrum in response to the request. The information related to the first spectrum and the second spectrum may include frequency ranges of the first spectrum and the second spectrum.

In 1012, the processing engine 112 (e.g., the receiving module 508) may receive, from the user (e.g., the user terminal 130), the second wireless network data over the first spectrum of the first wireless network allocated according to the protocol. The processing engine 112 may control a start time for transmitting the second wireless network data based on a control channel. For example, the processing engine 112 may send, based on the received RTS signal, a CTS signal allowing the start of the second wireless network data transmission or the first wireless network data transmission from the user terminal 130 to the base station 140. The start of the second wireless network data transmission may correspond to a time point indicating a start of the control channel. The second wireless network data from the user terminal 130 may be transmitted to the base station 140 over the first spectrum.

In 1014, the processing engine 112 (e.g., the receiving module 508) may receive, from the user (e.g., the user terminal 130), the control channel over the second spectrum of the first wireless network. The control channel may include one or more data frames to control the transmission of the second wireless network data. The processing engine 112 may control the start time for transmitting the second wireless network data based on the control channel. The control channel associated with the second wireless network from the user terminal 130 may be transmitted to the base station 140 over the second spectrum.

In 1012 and 1014, the processing engine 112 may transmit the second wireless network data over the first spectrum and transmit the control channel over the second spectrum simultaneously. The processing engine 112 may realize carrier aggregation between the second spectrum and the first spectrum. The carrier aggregation may enable a network operator to combine the radio channels within the same frequency band or across different bands to achieve high data rates and low latency.

In 1016, the processing engine 112 (e.g., the transmission module 506) may transmit, to the user (e.g., the user terminal 130), an ACK signal. The ACK may indicate a successful reception at the base station 140 of the second wireless network data transmitted by the user terminal 130.

It should be noted that the above descriptions about the processing of receiving, from the user terminal 130, the second wireless network data and the control channel associated with the second wireless network is provided for illustration purposes, and should not be designated as the only practical embodiment. For persons having ordinary skills in the art, after understanding the general principle of the process for receiving, from the user terminal 130, the second wireless network data and the control channel associated with the second wireless network, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Figure 10B:
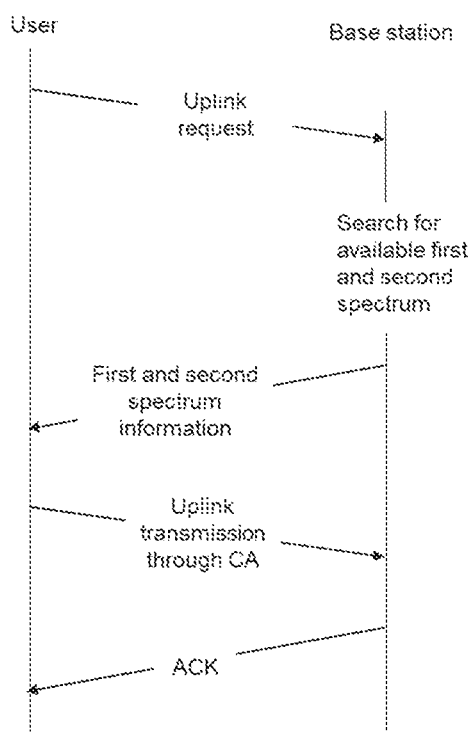
FIG. 10B illustrates an exemplary schematic diagram of an uplink data transmission in a UCA mode in the first wireless network and second wireless network coexistence framework according to some embodiments of the present disclosure.

FIG. 10B illustrates an exemplary schematic diagram of an uplink data transmission in a UCA mode in the first wireless network and second wireless network coexistence framework according to some embodiments of the present disclosure.

Figure 11A:
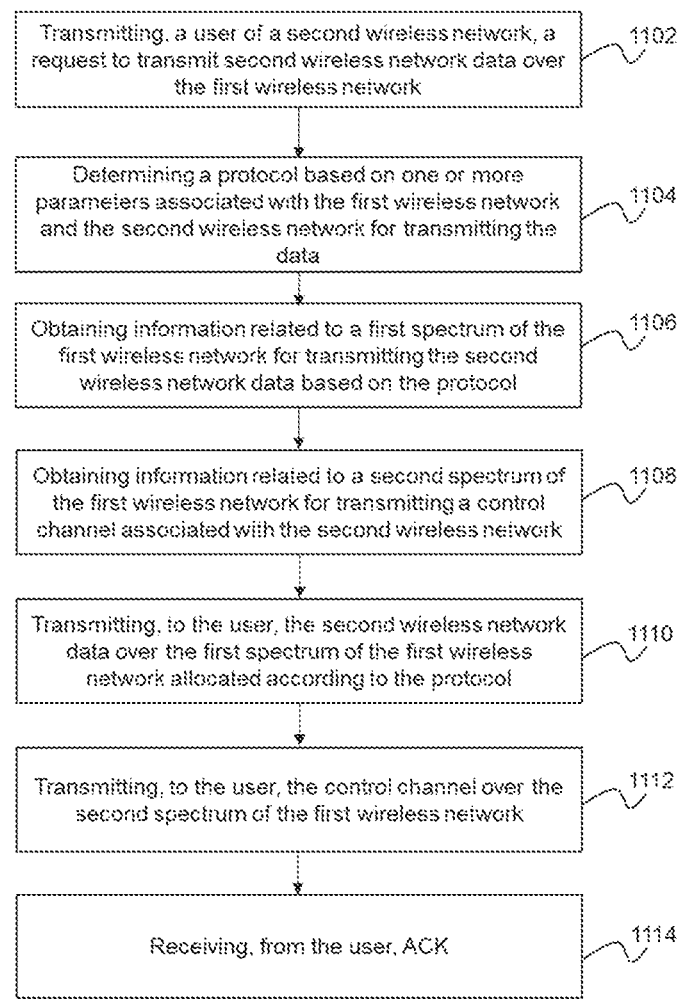
FIG. 11A illustrates an exemplary flowchart of a downlink data transmission in a UCA mode in the first wireless network and second wireless network coexistence framework according to some embodiments of the present disclosure.

FIG. 11A illustrates an exemplary flowchart of a downlink data transmission in a UCA mode in the first wireless network and second wireless network coexistence framework according to some embodiments of the present disclosure. In some embodiments, the processing engine 112 may perform the process 1100 to transmit, to the user terminal 130, the second wireless network data and the control channel associated with the second wireless network. In some embodiments, one or more operations of the process 1100 illustrated in FIG. 11A for transmitting, to the user terminal 130, the second wireless network data and the control channel associated with the second wireless network may be implemented in the exemplary network environment 100 illustrated in FIG. 1. For example, the process 1100 illustrated in FIG. 11A may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In some embodiments, the first wireless network may include a random access network, a contention based access network, or a wireless fidelity (i.e., Wi-Fi), or the like, or a combination thereof. The second wireless network may include a cellular network (i.e., LTE) and/or a controlled access network.

In 1102, the processing engine 112 (e.g., the transmission module 506) may transmit, to a user of a second wireless network (e.g., the user terminal 130), a request to transmit second wireless network data over the first wireless network. The second wireless network data may include LTE-U data. The LTE-U data may refer to data transmitted according to the LTE-U standard.

In 1104, the processing engine 112 (e.g., the protocol determination module 504) may determine a protocol based on one or more parameters associated with the first wireless network and the second wireless network for transmitting the data. In some embodiments, the protocol may be configured to enable the coexistence of the second wireless network data transmission and the first wireless network data transmission over the first spectrum. The protocol may indicate a resource allocation between the second wireless network data transmission and the first wireless network data transmission. The processing engine 112 may determine the protocol based on the HCF mechanism.

In the first wireless network and second wireless network coexistence framework 400, the channel access time is divided into a plurality of periodic beacon service intervals. Each of the plurality of beacon service intervals may include a CFP followed by a CP. The processing engine 112 may allocate the CFP for second wireless network data transmission. More description regarding the protocol may be found elsewhere in the present disclosure, for example, in FIG. 4 and the descriptions thereof.

In 1106, the processing engine 112 (e.g., the obtaining module 502) may obtain information related to a first spectrum of the first wireless network for transmitting the second wireless network data based on the protocol. In some embodiments, the first spectrum may be unlicensed spectrum and shared by the first wireless network data transmission and the second wireless network data transmission. The processing engine 112 may obtain or determine occupancy rate of first spectrums, a start time of the beacon service interval, and/or the length of the CFP base on the protocol. The processing engine 112 may search for the first spectrum based on the occupancy rate of first spectrums, the start time of the beacon service interval, and/or the length of the CFP, or any combination thereof. The processing engine 112 may determine the information related to the first spectrum to be used for the data transmission from the user terminal based on the search result.

The occupancy rate of a first spectrum may indicate a usage percentage of the first spectrum by any type of data transmission. The start time of the beacon service interval may indicate a time point when the medium is available for data transmission such as the second wireless network data transmission and the first wireless network data transmission. The processing engine 112 may determine the length of the CFP based on the load of the second wireless network data transmission, the resource requirement of the second wireless network data transmission, and/or real-time requirement of the second wireless network data transmission, or any combination thereof. More description regarding the length of the CFP may be found elsewhere in the present disclosure, for example, in FIG. 4 and the descriptions thereof.

In 1108, the processing engine 112 (e.g., the obtaining module 502) may obtain information related to a second spectrum of the first wireless network for transmitting a control channel associated with the second wireless network. In some embodiments, the second spectrum may be licensed spectrum. The processing engine 112 may obtain or determine occupancy rate of second spectrums and/or interference state of second spectrums. The processing engine 112 may search for the second spectrum based on the occupancy rate of second spectrums and/or the interference state of second spectrums. The interference state of a second spectrum may indicate a status as to whether a second spectrum is interfered by any signals and the level of interference when transmitting a signal between a source (e.g., the user terminal 130, the base station 140) and a receiver (e.g., the user terminal 130, the base station 140). The processing engine 112 may obtain the information related to the second spectrum based on the search result.

In 1110, the processing engine 112 (e.g., the transmission module 506) may transmit, to the user (e.g., the user terminal 130), the second wireless network data over the first spectrum of the first wireless network allocated according to the protocol. The processing engine 112 may control a start time for transmitting the second wireless network data based on a control channel. For example, the processing engine 112 may send, based on the received RTS signal, a CTS signal allowing the start of the second wireless network data transmission or the first wireless network data transmission from the user terminal 130 to the base station 140. The start of the second wireless network data transmission may correspond to a time point indicating a start of the control channel. The second wireless network data from the base station 140 may be transmitted to the user terminal 130 over the first spectrum.

In 1112, the processing engine 112 (e.g., the transmission module 506) may transmit, to the user (e.g., the user terminal 130), the control channel over the second spectrum of the first wireless network. The control channel may include one or more data frames to control the transmission of the second wireless network data. The processing engine 112 may control the start time for transmitting the second wireless network data based on the control channel. The control channel associated with the second wireless network from the base station 140 may be transmitted to the user terminal 130 over the second spectrum.

In 1110 and 1112, the processing engine 112 may transmit the second wireless network data over the first spectrum and transmit the control channel over the second spectrum simultaneously. The processing engine 112 may realize carrier aggregation between the second spectrum and the first spectrum. The carrier aggregation may enable a network operator to combine radio channels within the same frequency band or across different bands to achieve high data rates and low latency.

In 1114, the processing engine 112 (e.g., the transmission module 506) may receive, from the user (e.g., user terminal 130), an ACK signal. The processing engine 112 may then send, to the base station 140, the ACK signal. The ACK signal may indicate a successful reception at the user terminal 130 of the second wireless network data transmitted by base station 140.

It should be noted that the above descriptions about the processing of transmitting, to the user terminal 130, the second wireless network data and the control channel associated with the second wireless network over the first spectrum is provided for illustration purposes, and should not be designated as the only practical embodiment. For persons having ordinary skills in the art, after understanding the general principle of the process for receiving, from the user terminal 130, the second wireless network data and the control channel associated with the second wireless network over the first spectrum, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Figure 11B:
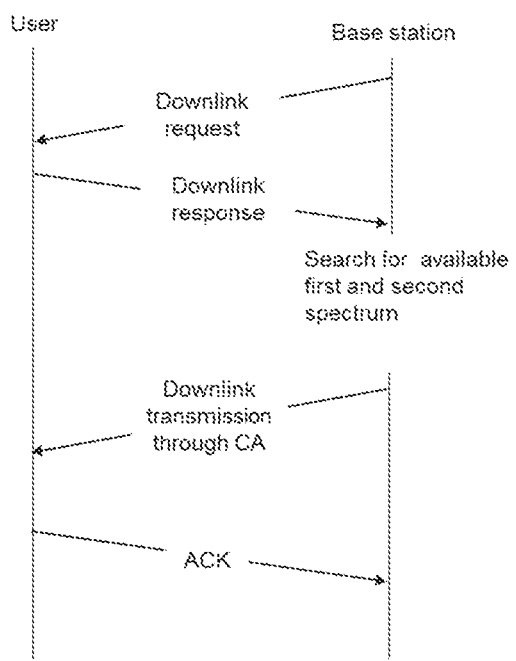
FIG. 11B illustrates an exemplary schematic diagram of a downlink data transmission in a UCA mode in the first wireless network and second wireless network coexistence framework according to some embodiments of the present disclosure.

FIG. 11B illustrates an exemplary schematic diagram of a downlink data transmission in a UCA mode in the first wireless network and second wireless network coexistence framework according to some embodiments of the present disclosure.

Figure 12:
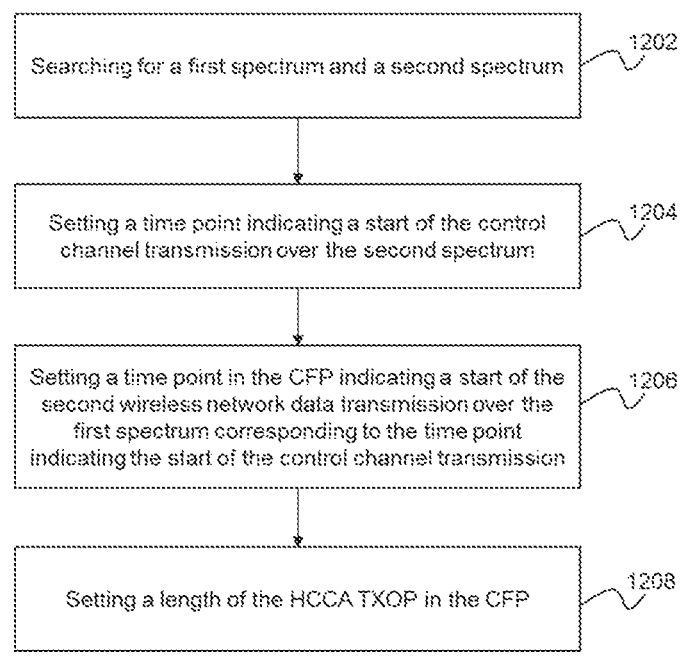
FIG. 12 illustrates an exemplary flowchart of setting a length of the HCCA TXOP in the CFP.

FIG. 12 illustrates an exemplary flowchart of setting a length of the HCCA TXOP in the CFP. In some embodiments, the processing engine 112 may perform the process 1200 to set the length of the HCCA TXOP in the CFP. In some embodiments, one or more operations of the process 1200 illustrated in FIG. 12 for setting the length of the HCCA TXOP in the CFP may be implemented in the exemplary network environment 100 illustrated in FIG. 1. For example, the process 1200 illustrated in FIG. 12 may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In 1202, the protocol determination module 504 (e.g., the allocation unit 602) may search for a first spectrum and a second spectrum. In some embodiments, the first spectrum may be unlicensed spectrum and shared by the first wireless network data transmission and the second wireless network data transmission. The protocol determination module 504 may obtain or determine occupancy rate of first spectrums, a start time of the beacon service interval, and/or the length of the CFP base on the protocol. The protocol determination module 504 may search for the first spectrum based on the occupancy rate of first spectrums, the start time of the beacon service interval, and/or the length of the CFP, or any combination thereof.

The occupancy rate of a first spectrum may indicate a usage percentage of the first spectrum by any type of data transmission. The start time of the beacon service interval may indicate a time point when the medium is available for data transmission such as the second wireless network data transmission and the first wireless network data transmission. The protocol determination module 504 may determine the length of the CFP based on the load of the second wireless network data transmission, the resource requirement of the second wireless network data transmission, and/or real-time requirement of the second wireless network data transmission, or any combination thereof. More description regarding the length of the CFP may be found elsewhere in the present disclosure, for example, in FIG. 4 and the descriptions thereof.

The protocol determination module 504 may obtain or determine occupancy rate of second spectrums and/or interference state of second spectrums. In some embodiments, the second spectrum may be licensed spectrum. The protocol determination module 504 may search for the second spectrum based on the occupancy rate of second spectrums and/or the interference state of second spectrums. The interference state of a second spectrum may indicate a status as to whether a second spectrum is interfered by any signals and the level of interference when transmitting a signal between a source (e.g., the user terminal 130, the base station 140) and a receiver (e.g., the user terminal 130, the base station 140).

In 1204, the protocol determination module 504 (e.g., the setting unit 604) may set a time point indicating a start of the control channel transmission over the second spectrum. The control channel may include one or more data frames to control the transmission of the second wireless network data.

In 1206, the protocol determination module 504 (e.g., the setting unit 604) may set a time point in the CFP indicating a start of the second wireless network data transmission over the first spectrum corresponding to the time point indicating the start of the control channel transmission. The protocol determination module 504 may control a start time for transmitting the second wireless network data based on the control channel. For example, the processing engine 112 may send, based on the received RTS signal, a CTS signal allowing the start of the second wireless network data transmission or the first wireless network data transmission from the user terminal 130 to the base station 140.

In 1208, the protocol determination module 504 (e.g., the length determination unit 606) may set a length of the HCCA TXOP in the CFP. In some embodiments, the length of the CFP may be an integer. In some embodiments, the protocol determination module 504 may transmit the second wireless network data subframes over the unlicensed band (e.g., the HCCA TXOP) and the licensed band to realize carrier aggregation. The protocol determination module 504 may set the length of the HCCA TXOP such that the HCCA TXOP is matched with a subframe of second wireless network data in the licensed band. For example, the start of a subframe of second wireless network data in the HCCA TXOP may correspond to the start of a subframe of second wireless network data transmitted over the licensed band.

It should be noted that the above descriptions about the processing of setting the length of the HCCA TXOP in the CFP is provided for illustration purposes, and should not be designated as the only practical embodiment. For persons having ordinary skills in the art, after understanding the general principle of the process for setting the length of the HCCA TXOP in the CFP, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Figure 13:
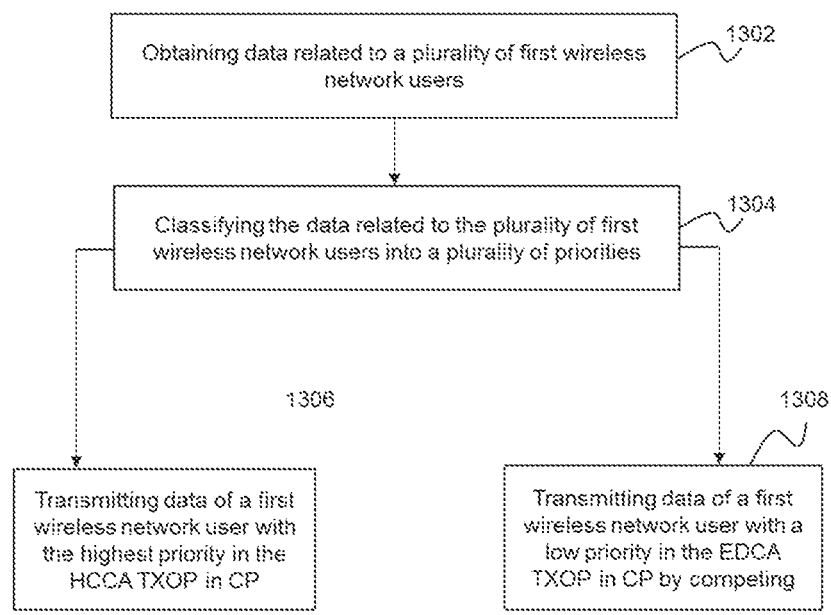
FIG. 13 illustrates an exemplary flowchart of transmitting first wireless network data in the first wireless network and second wireless network coexistence framework according to some embodiments of the present disclosure.

FIG. 13 illustrates an exemplary flowchart of transmitting first wireless network data in the first wireless network and second wireless network coexistence framework according to some embodiments of the present disclosure. In some embodiments, one or more operations of the process 1300 illustrated in FIG. 13 for transmitting the data related to the plurality of first wireless network users may be implemented in the exemplary network environment 100 illustrated in FIG. 1. For example, the process 1300 illustrated in FIG. 13 may be stored in a storage device in the form of instructions, and invoked and/or executed by the processing engine 112 (e.g., the processor 210 of the computing device 200 as illustrated in FIG. 2, the CPU 340 of the mobile device 300 as illustrated in FIG. 3).

In some embodiments, the first wireless network may include a random access network, a contention based access network, or a wireless fidelity (i.e., Wi-Fi), or the like, or a combination thereof. The second wireless network may include a cellular network (i.e., LTE) and/or a controlled access network.

In 1302, the processing engine 112 (e.g., the obtaining module 502) may obtain data related to a plurality of first wireless network users. The data related to the plurality of first wireless network users may refer to data transmitted via a wireless local area network (WLAN). The data related to the plurality of first wireless network users may include images, videos, audios, texts, or the like, or a combination thereof.

In 1304, the processing engine 112 (e.g., the classification module 510) may classify the data into a plurality of priorities based on the types of the data transmitted by the plurality of first wireless network users. The types of the data may include audio data, video data, best-effort data, and background data, or the like. In some embodiment, the processing engine 112 may classify the data into the plurality of priorities based on the different data flows or different packet lengths etc. In some embodiment, the classification module 510 may classify the data into the plurality of priorities based on a combination of the types of the data, the different data flows or different packet lengths, etc.

Data of the type of best-effort may be associated with the best-effort delivery. The best-effort delivery may describe a network service in which the network may not provide any guarantees that the data of the type of best-effort is delivered or that a first wireless network user is given a guaranteed quality of service level or a certain priority. Data of the type of background may refer to data related to applications in the background (e.g., backend processing) of a mobile device or the user terminal 130. In some embodiments, the processing engine 112 may classify the data into the plurality of priority based on data flows of the data, and/or packet lengths of the data.

The processing engine 112 may obtain a classification result after classifying the data related to the plurality of first wireless network users. The classification result may include a plurality of first wireless network users ranked by their respective priorities. As used herein, data except the data of a first wireless network user with the highest priority may be called as data of first wireless network users with low priorities or data with low priorities.

In 1306, the processing engine 112 (e.g., the transmission module 506) may transmit data of a first wireless network user with a high priority in the HCCA TXOP in the CP. In some embodiments, the processing engine 112 may determine whether there has high priority data of a first wireless network user that needs to be transmitted. The processing engine 112 may transmit the data of the first wireless network user with the highest priority in the HCCA TXOP in the CP in response to the determination that there has high priority data of a first wireless network user that needs to be transmitted. More description regarding transmitting the first wireless network data may be found elsewhere in the present disclosure, for example, in FIG. 4 and the descriptions thereof.

In 1308, the processing engine 112 (e.g., the transmission module 506) may transmit data of a first wireless network user with a low priority in the EDCA TXOP in the CP by competing. As described in connection with step 1304, low priority data traffic may have to compete accessing the medium for an opportunity to transmit in the EDCA TXOP. With EDCA, high-priority data has a higher probability than low-priority data to be transmitted. That is, a first wireless network user with high priority data traffic may experience less delay than a first wireless network user with low priority data traffic before the data is transmitted. In some embodiments, if the plurality of first wireless network users attempt to transmit data at a substantially same time, the processing engine 112 may detect one or more collisions. Then the processing engine 112 may prevent all of the plurality of first wireless network users from transmitting data and make them wait for a random interval. The plurality of first wireless network users may not restart transmitting data simultaneously, and only one first wireless network user may win the competition.

The processing engine 112 may transmit, in the EDCA TXOP in the CP, data of a first wireless network user who wins the competition. Then the processing engine 112 may continue to estimate state of the rest of the first wireless network users. The processing engine 112 may transmit, in the EDCA TXOP in the CP, data of a first wireless network user, of the rest of the first wireless network users, who wins the competition.

It should be noted that the above descriptions about the processing of setting the length of the HCCA TXOP in the CFP is provided for illustration purposes, and should not be designated as the only practical embodiment. For persons having ordinary skills in the art, after understanding the general principle of the process for setting the length of the HCCA TXOP in the CFP, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable medium having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out steps for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for wireless data transmission by optimizing spectrum sharing in a first wireless network, the system comprising:
   at least one computer-readable storage medium including a set of instructions; and
   at least one processor configured to communicate with the at least one computer-readable storage medium, wherein when executing the set of instructions, the at least one processor is directed to:
      receive, from a user of a second wireless network, a request to transmit second wireless network data over the first wireless network;
      determine a protocol based on one or more parameters associated with the first wireless network and the second wireless network for transmitting the second wireless network data, the protocol indicating a resource allocation between second wireless network data transmission and first wireless network data transmission, the protocol defining a beacon service interval for transmitting data frames over the first wireless network, the beacon service interval including:
         a contention free period (CFP) allocated for the second wireless network data transmission, the CFP including at least one transmission period for transmitting a second wireless network data frame of the second wireless network data, a length of the at least one transmission period being deter-
         mined based on load of the second wireless network data transmission; and
      obtain information related to a first spectrum of the first wireless network for transmitting the second wireless network data based on the protocol;
      obtain information related to a second spectrum of the first wireless network for transmitting a control channel associated with the second wireless network, the control channel including one or more data frames to control a start time for transmitting the second wireless network data; and
      transmit, to the user, the information related to the first spectrum and the information related to the second spectrum in response to the request.

2. The system of claim 1, wherein the beacon service interval further includes:
   a contention period (CP) allocated for the first wireless network data transmission.

3. The system of claim 2, wherein to determine the protocol for transmitting the data, the system is further directed to:
   determine a length of the beacon service interval based on a delay tolerance parameter of first wireless network users.

4. The system of claim 3, wherein to determine the protocol for transmitting the data, the system is further directed to:
   determine a length of the CFP in the beacon service interval based on at least one of:
      load of the second wireless network data transmission,
      resource requirement of the second wireless network data transmission, or
      Quality of Service (QoS) requirement of the second wireless network data transmission.

5. The system of claim 3, wherein to determine the protocol for transmitting the data, the system is further directed to:
   determine a length of the CP in the beacon service interval based on at least one of:
      load of the first wireless network data transmission,
      a collision probability of the first wireless network data transmission,
      the delay tolerance parameter of the first wireless network users,
      Quality of Service (QoS) requirement of the first wireless network data transmission, or
      performance variation of the first wireless network data transmission.

6. The system of claim 3, wherein to determine the protocol for transmitting the data, the system is further directed to:
   determine a ratio of a length of the CFP to a length of the CP based on at least one of:
      resource requirements of the second wireless network data transmission and the first wireless network data transmission, or
      performance requirements of the second wireless network data transmission and the first wireless network data transmission.

7. The system of claim 1, wherein the at least one processor, when executing the set of instructions, further directs the system to:
   receive data from users of the first wireless network over the first spectrum of the first wireless network, wherein each user of the first wireless network is assigned with a transmission priority based on at least one of:

type of data relating to the each user of the first wireless network,
data flow relating to the each user of the first wireless network, or
data packet length relating to the each user of the first wireless network.

8. The system of claim 7, wherein data of the each user assigned with a high transmission priority is transmitted using a hybrid coordination function controlled channel access (HCCA) scheme in an inherent transmit opportunity (TXOP) reservation period, and data of the each user assigned with a low transmission priority is transmitted using an enhanced distributed channel access (EDCA) scheme in the TXOP reservation period.

9. The system of claim 1, wherein the at least one processor, when executing the set of instructions, further directs the system to:
receive data from the user of the second wireless network over the first spectrum of the first wireless network; and
receive the control channel associated with the second wireless network over the second spectrum of the first wireless network.

10. The system of claim 1, wherein to determine the protocol for transmitting the data, the system is further directed to:
set a first time point in the CFP indicating a start of the second wireless network data transmission over the first spectrum to correspond to a second time point indicating a start of the control channel transmission over the second spectrum; and
set a length of the at least one transmission period in the CFP.

11. A method implemented on a computing device having at least one processor and storage for wireless data transmission by optimizing spectrum sharing in a first wireless network, the method comprising:
receiving, from a user of a second wireless network, a request to transmit second wireless network data over the first wireless network;
determining a protocol based on one or more parameters associated with the first wireless network and the second wireless network for transmitting the second wireless network data, the protocol indicating a resource allocation between second wireless network data transmission and first wireless network data transmission, the protocol defining a beacon service interval for transmitting data frames over the first wireless network, the beacon service interval including:
a contention free period (CFP) allocated for the second wireless network data transmission, the CFP including at least one transmission period for transmitting a second wireless network data frame of the second wireless network data, a length of the at least one transmission period being determined based on load of the second wireless network data transmission; and
obtaining information related to a first spectrum of the first wireless network for transmitting the second wireless network data based on the protocol;
obtaining information related to a second spectrum of the first wireless network for transmitting a control channel associated with the second wireless network, the control channel including one or more data frames to control a start time for transmitting the second wireless network data; and
transmitting, to the user, the information related to the first spectrum and the information related to the second spectrum in response to the request.

12. The method of claim 11, wherein the beacon service interval further includes:
a contention period (CP) allocated for the first wireless network data transmission.

13. The method of claim 12, wherein the determining the protocol for transmitting the data further comprises:
determining a length of the beacon service interval based on a delay tolerance parameter of first wireless network users.

14. The method of claim 13, wherein the determining the protocol for transmitting the data further comprises:
determining a length of the CFP in the beacon service interval based on at least one of:
load of the second wireless network data transmission,
resource requirement of the second wireless network data transmission, or
Quality of Service (QoS) requirement of the second wireless network data transmission.

15. The method of claim 13, wherein the determining the protocol for transmitting the data further comprises:
determining a length of the CP in the beacon service interval based on at least one of:
load of the first wireless network data transmission,
a collision probability of the first wireless network data transmission,
the delay tolerance parameter of the first wireless network users,
Quality of Service (QoS) requirement of the first wireless network data transmission, or
performance variation of the first wireless network data transmission.

16. The method of claim 11, further comprising:
receiving data from users of the first wireless network over the first spectrum of the first wireless network, wherein each user of the first wireless network is assigned with a transmission priority based on at least one of:
type of data relating to the each user of the first wireless network,
data flow relating to the each user of the first wireless network, or
data packet length relating to the each user of the first wireless network.

17. The method of claim 16, wherein data of the each user assigned with a high transmission priority is transmitted using a hybrid coordination function controlled channel access (HCCA) scheme in an inherent transmit opportunity (TXOP) reservation period, and data of the each user assigned with a low transmission priority is transmitted using an enhanced distributed channel access (EDCA) scheme in the TXOP reservation period.

18. The method of claim 11, further comprising:
receiving data from the user of the second wireless network over the first spectrum of the first wireless network; and
receiving the control channel associated with the second wireless network over the second spectrum of the first wireless network.

19. The method of claim 11, wherein the determining the protocol for transmitting the data further comprises:
setting a first time point in the CFP indicating a start of the second wireless network data transmission over the first spectrum to correspond to a second time point indicating a start of the control channel transmission over the second spectrum; and setting a length of the at least one transmission period in the CFP.

20. A non-transitory computer-readable medium, comprising at least one set of instructions for wireless data transmission by optimizing spectrum sharing in a first wireless network, when executed by at least one processor, the at least one set of instructions directs the at least one processor to:

receive, from a user of a second wireless network, a request to transmit second wireless network data over the first wireless network;

determine a protocol based on one or more parameters associated with the first wireless network and the second wireless network for transmitting the second wireless network data, the protocol indicating a resource allocation between second wireless network data transmission and first wireless network data transmission, the protocol defining a beacon service interval for transmitting data frames over the first wireless network, the beacon service interval including:

a contention free period (CFP) allocated for the second wireless network data transmission, the CFP including at least one transmission period for transmitting a second wireless network data frame of the second wireless network data, a length of the at least one transmission period being determined based on load of the second wireless network data transmission; and obtain information related to a first spectrum of the first wireless network for transmitting the second wireless network data based on the protocol;

obtain information related to a second spectrum of the first wireless network for transmitting a control channel associated with the second wireless network, the control channel including one or more data frames to control a start time for transmitting the second wireless network data; and transmit, to the user, the information related to the first spectrum and the information related to the second spectrum in response to the request.

* * * * *